US011966567B2

(12) United States Patent
Lo et al.

(10) Patent No.: US 11,966,567 B2
(45) Date of Patent: *Apr. 23, 2024

(54) SYSTEMS AND METHODS FOR GENERATING A PERSONALIZED LOBBY INTERFACE BASED ON CONTEST ATTRIBUTES AND USER ATTRIBUTES

(71) Applicant: DK Crown Holdings Inc., Boston, MA (US)

(72) Inventors: Frank Lo, Boston, MA (US); Brandon Joseph Ward, Somerville, MA (US); Brendan Thompson Grove, Brookline, MA (US); Jordan Mendell, Boca Raton, FL (US); Travis Dunn, Nashua, NH (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/180,456

(22) Filed: Mar. 8, 2023

(65) Prior Publication Data
US 2023/0221843 A1 Jul. 13, 2023

Related U.S. Application Data

(63) Continuation of application No. 17/409,437, filed on Aug. 23, 2021, now Pat. No. 11,604,569, which is a
(Continued)

(51) Int. Cl.
*G06F 3/0484* (2022.01)
*G06F 9/451* (2018.01)
(Continued)

(52) U.S. Cl.
CPC ............ *G06F 3/0484* (2013.01); *G06F 9/451* (2018.02); *G06F 16/24578* (2019.01); *G06F 16/9535* (2019.01)

(58) Field of Classification Search
CPC ............ G06F 3/0484; G06F 16/24578; G06F 16/9535; G06F 9/451
See application file for complete search history.

(56) References Cited

U.S. PATENT DOCUMENTS 9,468,851 B1  10/2016  Pieron
2002/0054088 A1  5/2002  Tanskanen et al.
(Continued)

OTHER PUBLICATIONS

Final Office Action on U.S. Appl. No. 16/440,604 dated Jan. 22, 2021.
(Continued)

*Primary Examiner* — Sang H Kim
(74) *Attorney, Agent, or Firm* — Foley & Lardner LLP

(57) ABSTRACT

Systems and methods for generating a personalized lobby interface based on contest attributes and user attributes for one or more users of a contest management system. The contest management system can generate, execute and maintain a plurality of contests, such as but not limited to, fantasy sports contests. Further, the contest management system can maintain a plurality of user profiles with each of the user profiles associated with at least one user. To provide content and/or recommendations to one or user profiles, the contest management system can create one or more personalized lobbies for each of the user profiles. The personalized lobbies can display one or more contests selected by the contest management system that a user associated with the respective user profile may be interested in based in part on their respective profile attributes and/or contest history.

20 Claims, 22 Drawing Sheets

Related U.S. Application Data continuation of application No. 16/440,604, filed on Jun. 13, 2019, now Pat. No. 11,126,331.

(60) Provisional application No. 62/684,511, filed on Jun. 13, 2018.

(51) Int. Cl.
  *G06F 16/2457* (2019.01)
  *G06F 16/9535* (2019.01)

(56) References Cited

U.S. PATENT DOCUMENTS

| | | |
|---|---|---|
| 2007/0186230 A1 | 8/2007 | Foroutan |
| 2009/0024457 A1 | 1/2009 | Foroutan |
| 2010/0203936 A1* | 8/2010 | Levy ............... A63F 13/12 463/4 |
| 2013/0184082 A1 | 7/2013 | Patchen |
| 2013/0337910 A1 | 12/2013 | Germany |
| 2015/0112918 A1 | 4/2015 | Zheng et al. |
| 2018/0169528 A1* | 6/2018 | Hinoshita ............. A63F 13/795 |
| 2019/0188272 A1 | 6/2019 | Chen et al. |
| 2019/0325707 A1 | 10/2019 | Aronson et al. |
| 2019/0381410 A1* | 12/2019 | Lo ....................... A63F 13/46 |

OTHER PUBLICATIONS

Non-Final Office Action on U.S. Appl. No. 16/440,604 dated Jul. 29, 2020.

Non-Final Office Action on U.S. Appl. No. 17/409,437 dated Jul. 21, 2022.

Notice of Allowance on U.S. Appl. No. 16/440,604 dated May 26, 2021.

Notice of Allowance on U.S. Appl. No. 17/409,437 dated Nov. 9, 2022.

\* cited by examiner

Lobby 202

| Sport | Contest | Style | Entry Fee | Total Prizes | Registrants | Live |
|---|---|---|---|---|---|---|
| Football | C1 | Classic | $5 | G$500,000 | 235K/118.9K | 00:22 |
| Football | C2 | Classic | $22 | G$200,000 | 22/7067 | 00:22 |
| Basketball | C3 | Pick'Em | $22 | G$250,000 | 143/14.7K | 01:01 |
| Football | C4 | Classic | $25 | G$57,000 | 6/302 | 00:45 |
| Football | C5 | Classic | $33 | G$125,000 | 24/5322 | 01:01 |
| Basketball | C6 | Classic | $8 | G$200,000 | 52/16.6K | 01:21 |
| Football | C7 | Pick'Em | $25 | G$8,000 | 3/295 | 00:45 |

Lobby 202

| Sport | Contest | Style | Entry Fee | Total Prizes | Registrants | Live |
|---|---|---|---|---|---|---|
| Football | C1 | Classic | $5 | G$500,000 | 965K/118.9K | 00:22 |
| Football | C2 | Classic | $22 | G$200,000 | 5024/7067 | 00:22 |
| Basketball | C3 | Pick'Em | $22 | G$250,000 | 11.2K/14.7K | 01:01 |
| Football | C4 | Classic | $25 | G$7,000 | 255/302 | 00:45 |

User History 802

| Sport | Contest | Style | Entry Fee |
|---|---|---|---|
| Baseball | C1' | Classic | $10 |
| Football | C2' | Classic | $10 |
| Football | C3' | Pick'Em | $2 |
| ... | ... | ... | ... |

FIG. 8A

Active contests 804

| Sport | Contest | Style | Entry Fee | Similar | Similarity Rank |
|---|---|---|---|---|---|
| Hockey | C1 | Pick'Em | $2 | No | N/A |
| Football | C2 | Classic | $10 | Yes | 1/10 |
| Basketball | C3 | Classic | $2 | Yes | 5/10 |
| ... | ... | ... | ... | ... | ... |

Similar contest 806

FIG. 8B

Content Management System 1000

Lobby 1305

| Contest | 1240a Contest Sport | 1240b Contest Type | 1240c Contest Entry Fee | 1240d Contest Total Prizes | 1240e Contest Registrants | 1240f Contest Registration Deadline | 1240g Contest Pacing Score | 1240h Contest Rank Value |
|---|---|---|---|---|---|---|---|---|
| Contest 1 1220a | Football | Classic | $30 | $500,000 | 206k/500k | 0:22 | 0.41 | 1 |
| Contest 2 1220b | Football | Classic | $20 | $350,000 | 125K/250K | 0:25 | 0.50 | 2 |
| Contest 3 1220c | Baseball | Pick'em | $10 | $200,000 | 335K/500K | 1:05 | 0.67 | 3 |
| Contest 4 1220d | Basketball | Classic | $15 | $300,000 | 305k/400k | 0:45 | 0.76 | 4 |
| ... | ... | ... | ... | ... | ... | ... | ... | ... |
| Contest N 1220n | Baseball | Pick'em | $25 | $250,000 | 555k/600k | 1:35 | 0.93 | 5 |

Continued from FIG. 15A

↓

1525 Generating a first personalized lobby for the first user profile having the one or more contests, the one or more contests are arranged in the first personalized lobby according to their respective rank values

↓

1530 Providing the first personalized lobby to the device associated with the first user profile with the one or more contests arranged in the personalized based on a likelihood that a first user associated with the first user profile will participate in the one or more contests

FIG. 15B

SYSTEMS AND METHODS FOR GENERATING A PERSONALIZED LOBBY INTERFACE BASED ON CONTEST ATTRIBUTES AND USER ATTRIBUTES

CROSS-REFERENCE TO RELATED APPLICATIONS

The present application claims is a continuation of and claims priority to U.S. patent application Ser. No. 17/409,437, filed Aug. 23, 2021, and entitled "SYSTEMS AND METHODS FOR GENERATING A PERSONALIZED LOBBY INTERFACE BASED ON CONTEST ATTRIBUTES AND USER ATTRIBUTES," which is a continuation of and claims priority to U.S. patent application Ser. No. 16/440,604, filed on Jun. 13, 2019, and entitled "SYSTEMS AND METHODS FOR GENERATING A PERSONALIZED LOBBY INTERFACE BASED ON CONTEST ATTRIBUTES AND USER ATTRIBUTES," which claims the benefit of and priority to U.S. Provisional Application 62/684,511, filed on Jun. 13, 2018, the contents of each of which are incorporated herein by reference in their entirety.

BACKGROUND OF THE DISCLOSURE

Content management systems allocate and use a lot of computing resources to transmit content to a very large number of remote computing devices. Similarly, remote computing devices also allocate and use a lot of computing resources to receive and display the content received from the content management systems. In the case of mobile devices where memory, processing power and power are all finite resources, the receipt and display of content that is not contextually relevant to a user can adversely affect the device's performance and life as well the overall user experience. As such, content management systems should utilize appropriate resource management policies to reduce the amount of contextually irrelevant content being delivered to the remote computing devices.

BRIEF SUMMARY OF THE DISCLOSURE

The present disclosure relates to one or more systems and methods for generating a personalized lobby interface based on contest attributes and user attributes for one or more users of a contest management system. The contest management system can generate, execute and maintain a plurality of contests, such as but not limited to, fantasy sports contests. Further, the contest management system can maintain a plurality of user profiles for each of the user profiles associated with users of the contest management system. To provide content and/or recommendations to one or more user profiles, the contest management system can create one or more personalized lobbies for each of the user profiles. The personalized lobbies can display one or more contests selected by the contest management system that a user associated with the respective user profile may be interested in based in part on their respective profile attributes and/or contest history.

The contest can arranged within each of the personalized lobby based on a variety of different parameters, such as but not limited to, a likelihood a user will participate in the contest, pacing parameters of the respective contest, and/or rank values. In some embodiments, the contest management system can provide the personalized lobbies to one or more devices associated with the respective user profiles.

In a first aspect, a method for generating a personalized lobby interface based on contest attributes and user attributes is provided. The methods includes receiving, by one or more processors, a request for one or more contests from a device associated with a first user profile, the user profile including an activity profile and one or more profile attributes, the request including one or more contest attributes, identifying, by the one or more processors, a user vector associated with the first user profile, the user vector linking the first user profile with one or more user profiles of a plurality of user profiles in a contest management system; each of the user profiles in the user vector having similar profile attributes, and determining, by the one or more processors using a selection algorithm, the one or more contests from a plurality of contests for the first user profile based on the activity profile, the one or more profile attributes of user profiles in the user vector and the one or more contest attributes.

The method further includes assigning, by the one or more processors using a ranking algorithm, rank values for the one or more contests, the rank values assigned to the one or more contests based on contest attributes associated with the one or more contests, the contest attributes including registration ratios and registration deadlines, generating, by the one or more processors, a first personalized lobby for the first user profile having the one or more contests, wherein the one or more contests are arranged in the first personalized lobby according to their respective rank values, and providing, by the one or more processors, the first personalized lobby to the device associated with the first user profile with the one or more contests arranged in the personalized based on a likelihood that a first user associated with the first user profile will participate in the one or more contests.

The method can include generating, by the one or more processors, a contest profile for the first user profile based on the activity profile, the activity profile including a contest history for the first user profile and a user type corresponding to the first user profile. In some embodiments, one or more processors can extract, from the one or more user profiles linked with the first user profile in the user vector, a plurality of profile attributes, the plurality of profile attributes including contests in which the first user profile has participated and contests in which the one or more user profiles linked with the first user profile in the user vector have participated, and generate one or more recommendations for contests from the plurality of contests based on the plurality of profile attributes.

The one or more processors can determine, using the selection algorithm, the recommended contests from the plurality of contests based on the plurality of profile attributes associated with the user vector. The recommendations provided in the first personalized lobby can be updated based on modifications to the first user profile or at least one user profile of the one or more user profiles linked with the first user profile in the user vector. The method can include generating, by the one or more processors, a second personalized lobby for a second user profile of the one or more user profiles linked with the first user profile in the user vector, the second personalized lobby including the one or more contests arranged in the second personalized lobby according to their respective rank values, and providing, by the one or more processors, the second personalized lobby to the device associated with the second user profile with the one or more contests arranged in the personalized based on a likelihood that a second user associated with the second user profile will participate in the one or more contests. A plurality of profile attributes can be extracted, by the one or more processors, from the second user profile. The plurality of profile attributes including contests in which the second user profile has participated and contests in which the one or more user profiles linked with the first user profile in the user vector have participated. One or more recommendations can be generated for contests from the plurality of contests based on the plurality of profile attributes.

The method can include updating the recommendations provided in the second personalized lobby based on modifications to the first user profile or at least one user profile of the one or more user profiles linked with the first user profile in the user vector. The profile attributes can include one or more of the following: a history of past contests, a plurality of lineups, a user type, a location, and price parameters. The contest attributes can include one or more of the following: a sport category, a price parameter, a prize parameter, a registrant threshold, a registrant limit, a current registrant count, a day value, a time value, a duration value, a contest type, and an experience level.

In at least one aspect, a system for generating a personalized lobby interface based on contest attributes and user attributes is provided. The system can include one or more processors and memory. The memory can include computer-readable instructions stored in memory that, when executed by the one or more processors, cause the one or more processors to receive a request for one or more contests from a device associated with a first user profile. The user profile can include an activity profile and one or more profile attributes. The request can include one or more contest attributes. The computer-readable instructions can cause the one or more processors to identify a user vector associated with the first user profile. The user vector can link the first user profile with one or more user profiles of a plurality of user profiles in a contest management system. Each of the user profiles in the user vector can have similar profile attributes. The computer-readable instructions can cause the one or more processors to determine, using a selection algorithm, the one or more contests from a plurality of contests for the first user profile based on the activity profile, the one or more profile attributes of user profiles in the user vector and the one or more contest attributes. The computer-readable instructions can cause the one or more processors to assign, using a ranking algorithm, rank values for the one or more contests. The rank values can be assigned to the one or more contests based on contest attributes associated with the one or more contests. The contest attributes can include registration ratios and registration deadlines. The computer-readable instructions can cause the one or more processors to generate a first personalized lobby for the first user profile having the one or more contests. The one or more contests can be arranged in the first personalized lobby according to their respective rank values. The computer-readable instructions can cause the one or more processors to provide the first personalized lobby to the device associated with the first user profile with the one or more contests arranged in the personalized based on a likelihood that a first user associated with the first user profile will participate in the one or more contests.

In embodiments, the computer-readable instructions can cause the one or more processors to generate a contest profile for the first user profile based on the activity profile. The activity profile can include a contest history for the first user profile and a user type corresponding to the first user profile. The computer-readable instructions can cause the one or more processors to extract, from the one or more user profiles linked with the first user profile in the user vector, a plurality of profile attributes. The plurality of profile attributes can include contests in which the first user profile has participated and contests in which the one or more user profiles linked with the first user profile in the user vector have participated. The computer-readable instructions can cause the one or more processors to generate one or more recommendations for contests from the plurality of contests based on the plurality of profile attributes. The computer-readable instructions can cause the one or more processors to determine, using the selection algorithm, the recommended contests from the plurality of contests based on the plurality of profile attributes associated with the user vector.

In embodiments, the computer-readable instructions can cause the one or more processors to update the recommendations provided in the first personalized lobby based on modifications to the first user profile or at least one user profile of the one or more user profiles linked with the first user profile in the user vector. The computer-readable instructions can cause the one or more processors to generate a second personalized lobby for a second user profile of the one or more user profiles linked with the first user profile in the user vector. The second personalized lobby can include the one or more contests arranged in the second personalized lobby according to their respective rank values. The computer-readable instructions can cause the one or more processors to provide the second personalized lobby to the device associated with the second user profile with the one or more contests arranged in the personalized based on a likelihood that a second user associated with the second user profile will participate in the one or more contests.

In embodiments, the computer-readable instructions can cause the one or more processors to extract, from the second user profile, a plurality of profile attributes. The plurality of profile attributes can include contests in which the second user profile has participated and contests in which the one or more user profiles linked with the first user profile in the user vector have participated. The computer-readable instructions can cause the one or more processors to generate, one or more recommendations for contests from the plurality of contests based on the plurality of profile attributes. The computer-readable instructions can cause the one or more processors to update the recommendations provided in the second personalized lobby based on modifications to the first user profile or at least one user profile of the one or more user profiles linked with the first user profile in the user vector. In embodiments, the profile attributes include one or more of the following: a history of past contests, a plurality of lineups, a user type, a location, and price parameters. The contest attributes can include one or more of the following: a sport category, a price parameter, a prize parameter, a registrant threshold, a registrant limit, a current registrant count, a day value, a time value, a duration value, a contest type, and an experience level.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 8A depicts one or more embodiments of a user history;

FIG. 8B depicts one or more embodiments of an active contests database;

FIG. 13 depicts one or more embodiments of a personalized lobby showing contests provided by a contest management system;

FIGS. 15A-15B show a flow diagram of a method for generating a personalized lobby interface based on contest attributes and user attributes.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for monitoring a pace of registrations of contests for improved allocation of computer resources and for ranking contests.

Section C describes embodiments of systems and methods for generating contest recommendations to divert registrations across contests.

Section D describes embodiments of systems and methods for generating a personalized lobby interface based on contest attributes and user attributes.

A. Computing and Network Environment

Figure 1A:
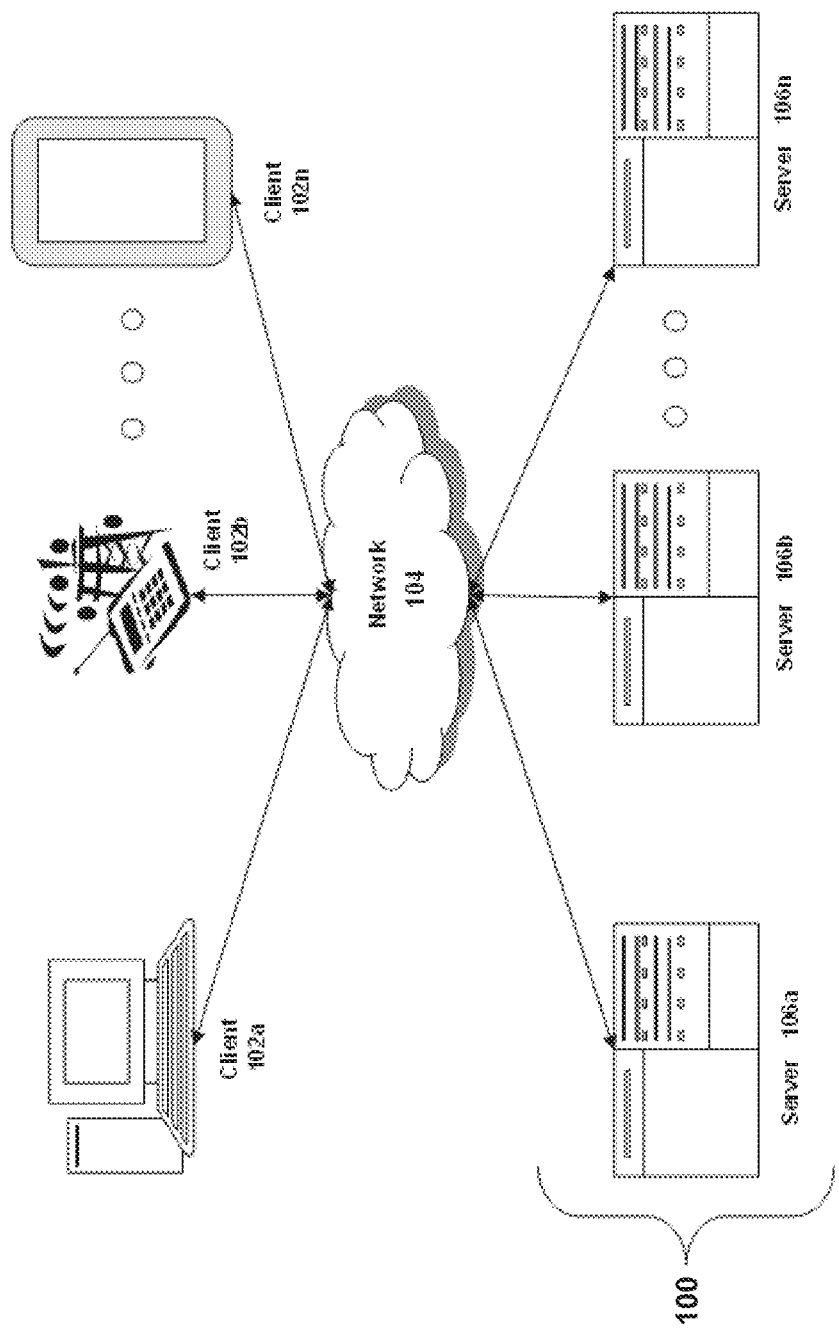
FIG. 1A is a block diagram depicting an embodiment of a network environment comprising client devices in communication with server devices via a network.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2050 (IMT-2050) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
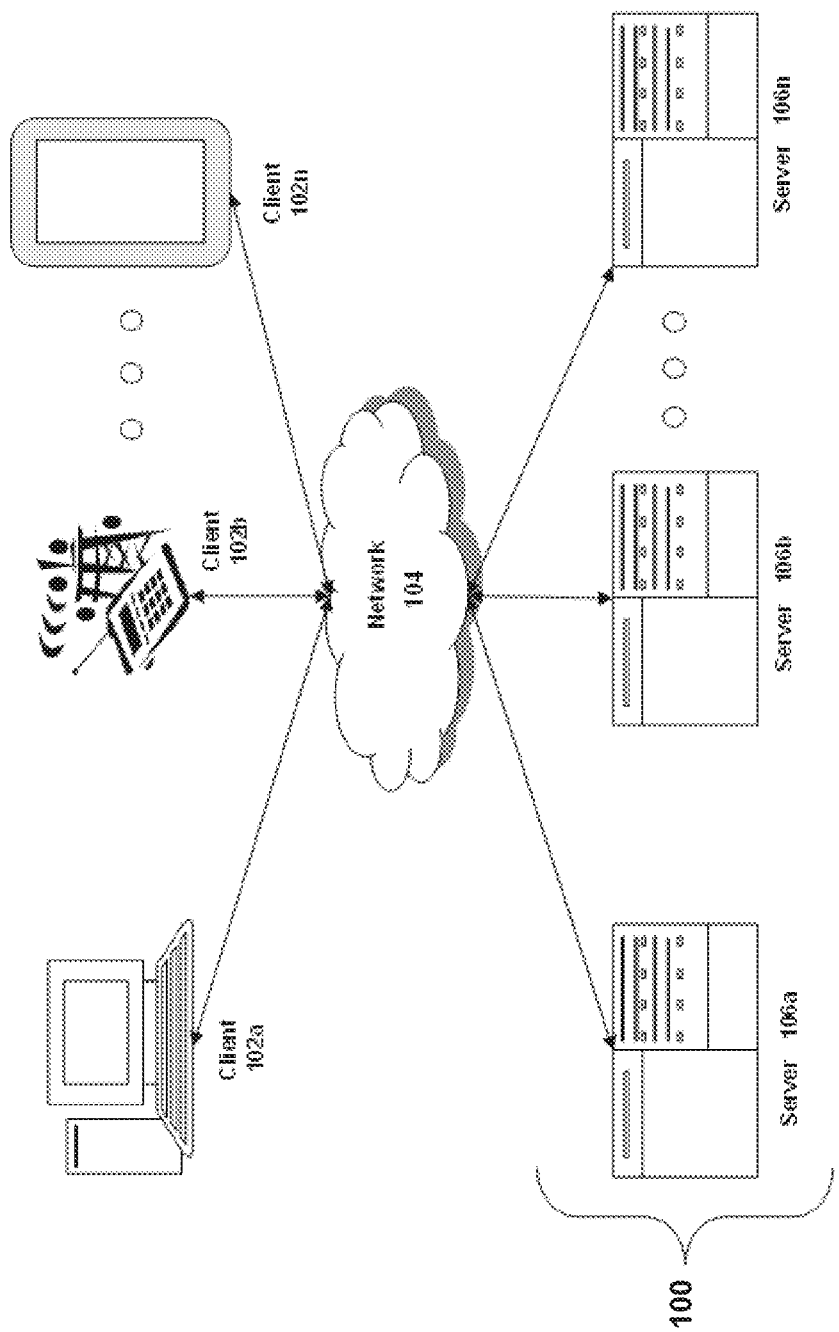
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKY-DRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROP-BOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
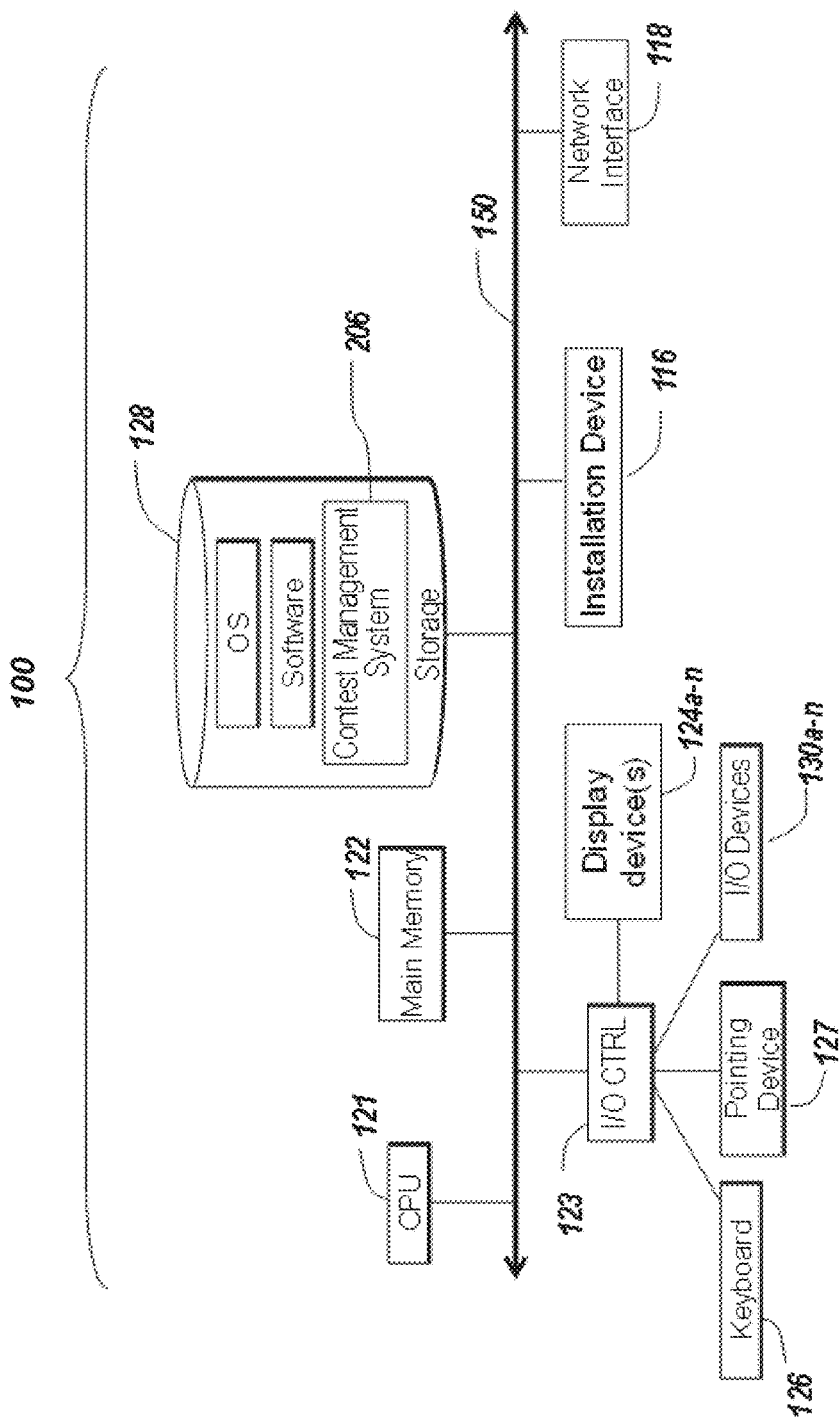
FIGS. 1C and 1D are block diagrams depicting embodiments of computing devices useful in connection with the methods and systems described herein.
Figure 1D:
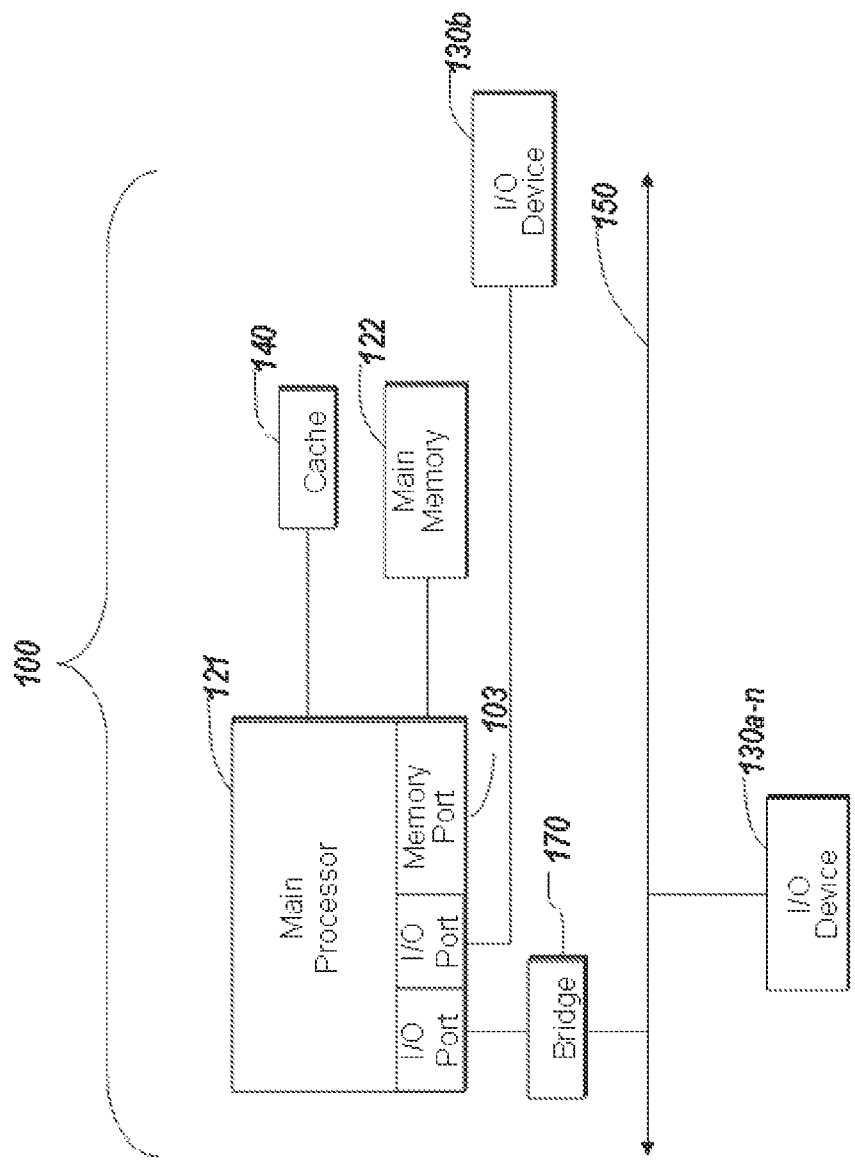

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a contest management system 206. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software for the contest management system 206. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage devices 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2050, WINDOWS Server 2022, WINDOWS CE, WINDOWS Phone, WINDOWS XP, WINDOWS VISTA, and WINDOWS 7, WINDOWS RT, WINDOWS 8, and WINDOWS 10, all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a tablet e.g. the IPAD line of devices by Apple; GALAXY TAB family of devices by Samsung; or KINDLE FIRE, by Amazon.com, Inc. of Seattle, Washington In other embodiments, the computing device 100 is an eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Monitoring a Pace of Registrations of Contests for Improved Allocation of Computer Resources As discussed above, systems and methods of the present solution are directed to generating contests to improve computer resource allocation. A contest generating system can avoid or can delay generating new contests and thus avoid registrant dispersion issues, and can help to ensure that fewer contests with more registrants are generated, thus conserving and better allocating computer resources.

According to one aspect, a method for generating contests includes maintaining, by a contest management system including one or more processors, for each first contest of a plurality of first contests managed by the contest management system, historical registration data. The historical registration data identifies, for each time of a plurality of times during which registration of the first contest was open, a number of registrants at the time. Each first contest has respective parameter values of one or more parameters used to generate the first contest. The method further includes identifying, by the contest management system, for a second contest that has an open registration status, respective parameter values of one or more parameters used to generate the second contest, and registration data identifying, for each time of a plurality of times that has lapsed since registration for the second contest was opened, a current number of registrants at the time. The method further includes computing, by the contest management system, a similarity score between the second contest and each first contest of the plurality of first contests. The similarity score can be computed using i) the respective parameter values used to generate the second contest and generate the first contest and ii) the registration data of the second contest and the historical registration data of the first contest. The method further includes selecting, by the contest management system, for the second contest, a subset of the plurality of first contests based on the similarity score exceeding a threshold similarity score value. The method further includes generating, by the contest management system, for the second contest, a projected number of registrants based on i) a current number of registrants of the second contest and ii) the historical registration data of one or more first contests included in the selected subset. The method further includes determining, by the contest management system, a time at which to generate a fourth contest based on the projected number of registrants, and generating, by the contest management system, the fourth contest at the determined time.

Figure 2A:
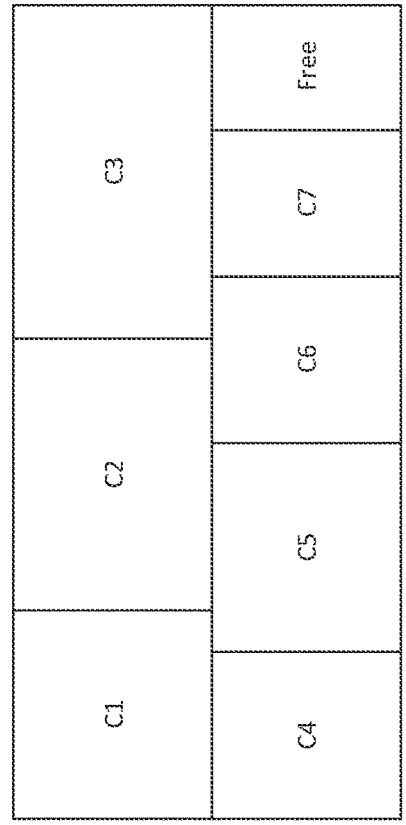
FIG. 2A depicts a contest lobby showing contests and a corresponding allocation of computer resources.

Referring now to FIG. 2A, a representation of a lobby 202 including contests C1 through C7 is shown. Data or computer resources to allow a client device to render or otherwise present the lobby 202 may be transmitted to the client device by the contest management system 206. The lobby 202 shows seven contests that are open for registration on a first page or first screen, but more contests (including one or more that are open for registration) can be maintained by the contest management system 206 and may be displayable responsive to the client device transmitting a request for more contests to the contest management system 206.

The lobby 202 may show, for one or more of the contests C1 through C7 (e.g. for each contest), a sport category, a contest name or identifier, a contest style, an entry fee, a total prize pool for the contest, a total number of entries and a maximum registrant cap (which may be a dynamic cap that increases or decreases over time, or increases or decreases based on other factors such as current registrant data and/or projected registrant data), and a time corresponding to a registration deadline (e.g. a countdown to the contest going "live," or a time of the registration deadline). Other information (e.g. contest relevant information) may be displayed in place of, or in addition to, any of the information shown in FIG. 2A, and any of the information shown in FIG. 2A may be omitted as appropriate. As can be seen in FIG. 2A, the contests C1 through C7 do not have many registrants relative to their registrant cap. The registrants are dispersed over the seven contests, even though each contest has significant capacity to include or register more registrants such that all registrants could be accommodated with a smaller number of contest.

A block figure showing computer resource allocation 204 is also shown in FIG. 2A. In some embodiments, the computer resource allocation 204 can represent the total resources the system has allocated to hosting contests. As shown in FIG. 2A, each of the contests C1-C7 utilize or consume certain amounts of computer resources, which are indicated by the respective blocks shown in FIG. 2A. The computer resource allocation 204 corresponds to resources allocated by the contest management system 206 to maintain and/or update the contests C1 through C7 (e.g. processing power, processing time, time on a cloud or otherwise remote computing system, or other computer resources). As can be seen in FIG. 2A, a "free" or available amount of computer resources is small relative to the resources required to maintain or update all seven contests. As such, if the contest management system 206 needs to create or generate additional contests, the contest management system 206 may not have sufficient computer resources to do so until additional computer resources are made available to the contest management system or contests utilizing existing computer resources are terminated and free up the computer resources they were consuming.

Figure 2B:
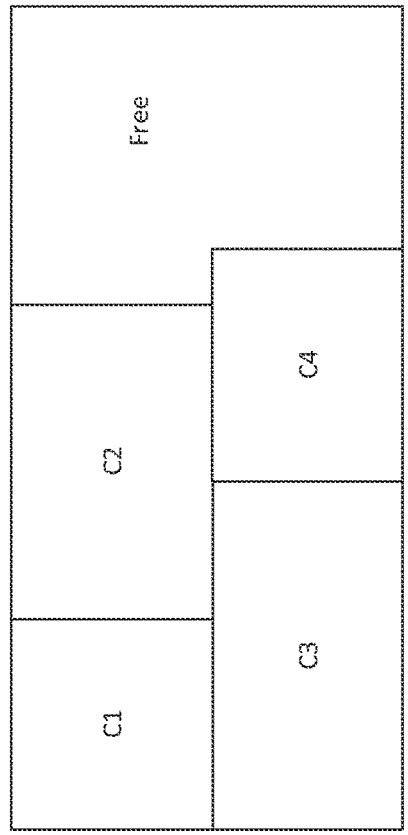
FIG. 2B depicts a contest lobby showing contests and a corresponding allocation of computer resources.

FIG. 2B shows a lobby 202 that includes contests C1 through C4. Contests for the lobby 202 shown in FIG. 2B are generated by a contest ranking system 302 (which can be included in the contest management system 206) as described herein. As can be seen in FIG. 2B, fewer contests are open for registration and as a result fewer computer resources are being utilized allowing the contest management system 206 sufficient computer resources to generate new contests. In addition to utilizing fewer computer resources, the total number of registrants in each contest, and the number of registrants as a percentage of the registrant cap of each contest, is increased as compared to the example shown in FIG. 2A. The increased number of registrations represents better computer resource utilization per registrant, enabling the contest management system to scale up without needing to increase the computer resources. As there is still room in each contest C1 through C4, further registrants can still be accommodated.

As can be seen in the computer resource allocation 204 shown in FIG. 2B, resources need only be allocated for four contests. Maintaining and updating each contest may have a cost in terms of computer resources, and by lowering the total number contests to be maintained or updated, computer resources can be preserved. The computer resource allocation 204 shown in FIG. 2B shows that there are more "free" computer resources than in the example shown in FIG. 2A, in which seven contests C1 through C7 were generated.

Figure 3:
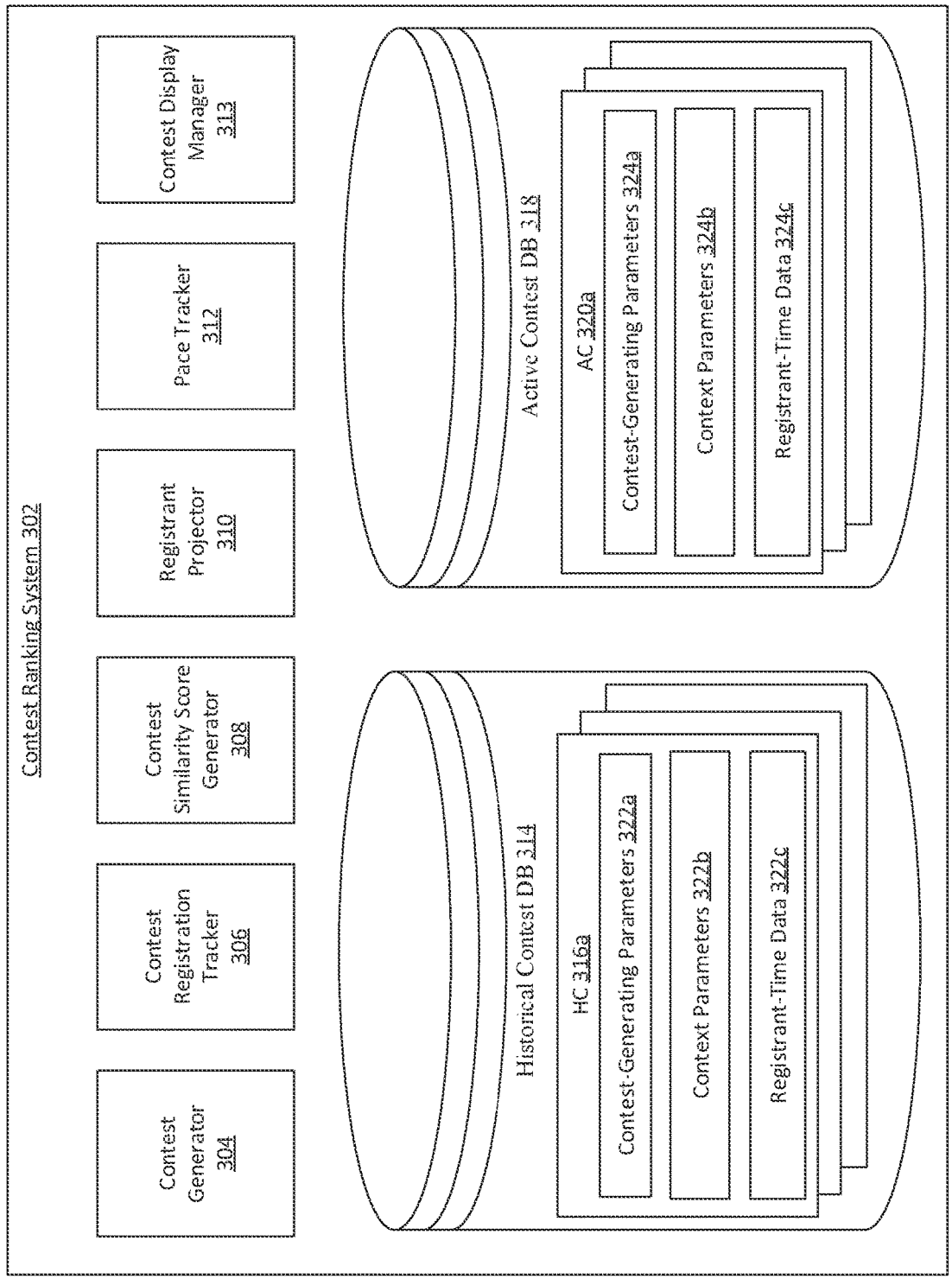
FIG. 3 is a block diagram depicting one or more embodiments of a contest ranking system.

FIG. 3 is a block diagram showing an embodiment of a contest ranking system 302. The contest ranking system 302 can be included in the contest management system 206 depicted in FIG. 1C. The contest ranking system 302 can include or be executed on one or more servers, such as the servers 106 shown in FIG. 1A. The contest ranking system 302 can include one or more applications, services, routines, servers, daemons, or other executable logics for generating a contest, including one or more of a contest generator 304, a contest registration tracker 306, a contest similarity score generator 308, a registrant projector 310, a pace tracker 312, and a contest display manager 313. The contest ranking system 302 can also include, access, maintain or manage one or more data structures, including but not limited to a historical contest database 314 (historical contest DB 314), and an active contest database 318 (active contest DB 318).

The contest generator 304 can include components, subsystems, modules, scripts, applications, or one or more sets of computer-executable instructions and can be configured to generate a contest. The contest generator 304 can be configured to generate a contest by generating a contest object based on one or more contest-generating parameter values. The contest-generating parameter values can include, for example, values for parameters including one or more of a league (e.g. NFL, MLB, NHL, NBA, a non-US league, or another sports organization), a game type (e.g. classic (with salary constraints) or pick'em (without salary constraints)), a registrant cap (e.g. a fixed cap, no cap, or a dynamic cap that changes based on demand or based on an instruction to change from another component, subsystem, module, script, or application of the contest ranking system 302), one or more games, a registration close time (e.g. a particular date and time, such as the date and time of the start of a first game of the contest), an entry fee, an eligibility specification requirement (e.g. a specification that only users having a certain experience level (e.g. as determined by a user profile) be permitted to enter the contest), a prize type (e.g. a satellite (a contest having a fixed number of entries to another contest as at least part of a prize pool), a super-satellite (a contest having a dynamic number of entries to another contest as at least part of a prize pool (e.g. the dynamic number based on number of registrants), or a normal prize type (including monetary prizes as at least part of a prize pool). The contest-generating parameter values can include any other appropriate parameter for generating a contest.

The contest generator 304 can be further configured to generate a contest at a particular timing or according to a schedule or based on upcoming games. For example, the contest generator 304 can be configured to generate one or more contests corresponding to an upcoming game, or corresponding to a set of games played on one or more days (e.g. on a particular day or in a particular week). The contest generator may be configured to generate a contest when an active contest hits its fixed registrant cap (has a number of registrants equal to a fixed registrant cap).

The contest generator 304 can be further configured to deviate from a schedule, or to generate a contest at a determined time, based on data received from another component, subsystem, module, script, or application of the contest ranking system 302. For example, the contest generator 304 can be configured to determine a time at which to generate a contest based on a pacing determined by the pace tracker 312 (e.g. a pacing of one or more active contests). The contest generator 304 can be configured to deviate from a schedule (e.g. to delay generation of a scheduled contest, or to restrict generation of a scheduled contest) based on a pacing determined by the pace tracker 312. The contest generator 304 can determine a timing for generating a new contest based on pacing information for more than one contest, and may weigh the pacing information based on features of the one or more contests (e.g. based on respective total numbers of registrants for the contests, and/or based on respective registrant caps for the contests). For example, as is described in more detail below with reference to the pace tracker 312, the pace tracker 312 may determine that one or more active contests are under-saturated (e.g. are below a projected or desired pace for the active contest, or below a projected or desired number of registrants). The contest generator 304 may be configured such that, based on or responsive to this determination, the contest generator 304 restricts generation of a scheduled contest.

The contest generator 304 may determine a time at which to generate a contest based on a policy for generating new contest. The policy may include a schedule for generating new contests including candidate times for generating a new contest. The policy may include one or more rules for determining, at one of the candidate times for generating a new contest, via the pace tracker 312 of the contest ranking system 302, whether one or more contests is under-saturated, and responsive to determining that the one or more contests is under-saturated, restricting generating a new contest at the one of the candidate times for generating a new contest. This can result in conserving computer resources by restricting the contest generator 304 from generating new contests when a number of currently active contests is determined to be sufficient to satisfy registrant needs.

The contest registrant tracker 306 can include components, subsystems, modules, scripts, applications, or one or more sets of computer-executable instructions and can be configured to track registrants for one or more contests. For example, the contest registrant tracker 306 may track, for each of one or more contests, how many users are registered for the respective active contest at a plurality of times. The contest registrant tracker 306 may maintain or reference a registrant profile that includes a plurality of time-registrant pairs for one or more contests. A registrant-time pair may include a pair of associated data that indicates a time and a corresponding number of registrants. The contest registrant tracker 306 may reference the active contest DB 318 to track registrants for active contests. The contest registrant tracker 306 may also determine registrant profile parameter values related to characteristics of registrant profiles for contests. Registrant profile data, for example, may be parametrized as registrant profile parameters (such as, for example, a maximum number of registrants, an integral of a number of registrants (e.g. between a first time and a second time), a number of registrants at a particular time (e.g. a time based on a time at which registration opened or a time based on a time at which registration closes), or parameters of a linear, exponential, or other function representing the registrant profile).

Figure 5:
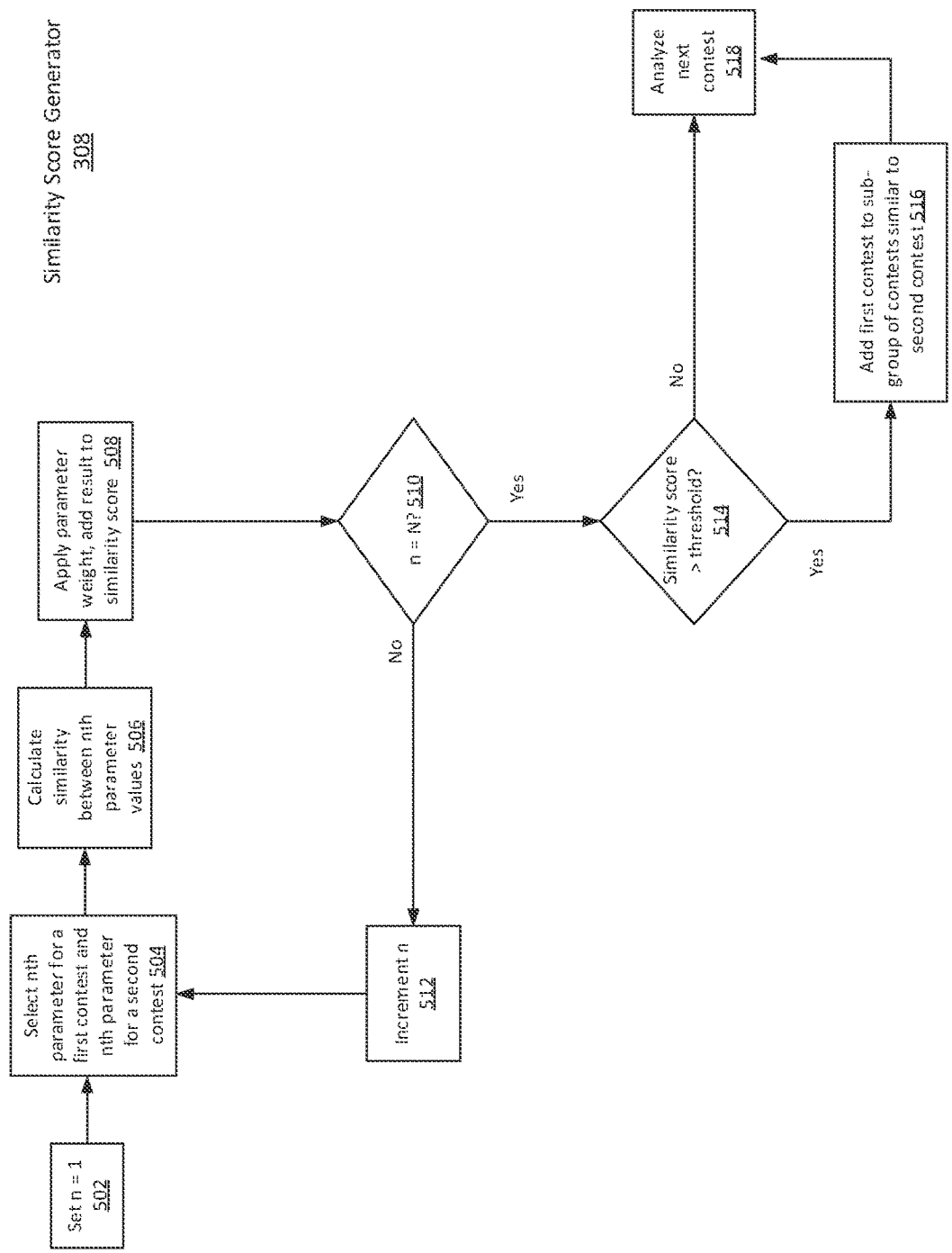
FIG. 5 is a flow chart depicting one or more embodiments of a process for determining one or more contests that are similar to a target contest.

The contest similarity score generator 308 can include components, subsystems, modules, scripts, applications, or one or more sets of computer-executable instructions and can be configured to generate a similarity score for a pair of contests, or a similarity score for a first contest and a set of one or more second contests. The contest similarity score generator 308 can determine a similarity score between a first contest and one or more second contests based on respective parameter values for parameters of the contests (e.g. contest-generating parameters of the contests and/or registrant profiles of the contests). The contest similarity score generator 308 can determine a similarity score based on determining a similarity between parameter values of parameters of the pair of contests as described herein with respect to FIG. 5. The contest similarity score generator 308 can determine the similarity score based on applying weights (e.g. pre-determined weights) to the determined similarity between parameter values. The contest similarity score generator 308 may determine a similarity score for each of a set of second contests relative to a first contest. The contest similarity score generator 308 may generate a subset of contests of the set of second contests (for which, for example, each contest of the subset of contests has a similarity score above a threshold, or for which the subset of contests includes a predetermined number of contests having the highest similarity score of the set of second contests). An example embodiment of the contest similarity score generator 308 generating a similarity score for each of a set of second contests relative to a first contest is shown in FIG. 5.

Figure 6:
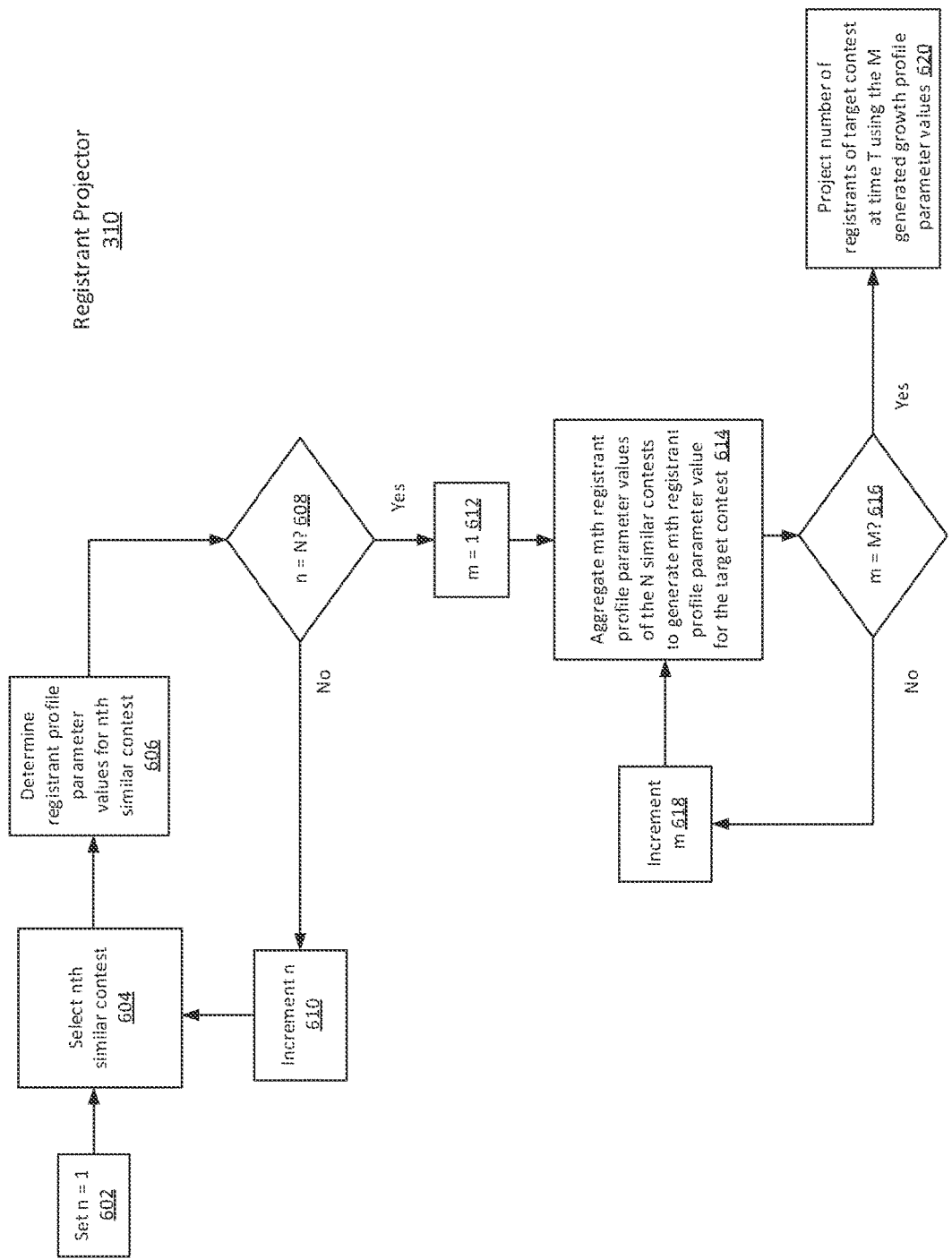
FIG. 6 is a flow chart depicting one or more embodiments of a process for projecting a number of registrants for a target contest.

The registrant projector 310 can include components, subsystems, modules, scripts, applications, or one or more sets of computer-executable instructions and can be configured to generate a projection of a future number of registrants for a contest. The registrant projector 310 can determine one or more registrant-profile parameters for a contest. For example, the registrant projector 310 can determine one or more registrant-profile parameters for a target contest based on registrant-profile parameters of contests determined by the contest similarity score generator 308 to be similar to the target contest. The determined registrant-profile parameters for the target contest can be used to project a number of registrants for the target contest at a point in time between opening of registration and close of registration for the target contest. An example of such projection by the registrant projector 310 is shown in FIG. 6, and is described in more detail below. The registrant-profile parameters may include parameters for a linear equation that is a function of time that outputs a projected number of registrants at a given time. A "projection profile" can be a set of such outputs across a span of time.

In other embodiments, the registrant projector 310 need not determine registrant-profile parameters for the target contest. The registrant projector 310 can determine a projected number of registrants for the target contest at a point in time relative to opening of registration or close of registration based on a number of registrants at a corresponding point in time for one or more similar contests (e.g. determined to be similar by the contest similarity score generator 308).

The pace tracker 312 can include components, subsystems, modules, scripts, applications, or one or more sets of computer-executable instructions and can be configured to track a pace of a contest. The pace tracker 312 can determine a projected or desired number of registrants for a target contest at a particular time (e.g. a particular time relative to opening of registration or close of registration). The projected or desired number of registrants can be determined based on registrant data or a registrant profile for one or more contests similar to the target contest. The projected or desired number of registrants can be determined based on registrant-profile parameters determined for the target contest by the registrant projector 310.

The pace tracker 312 can determine a difference between a number of registrants for the target contest at a point in time (e.g. a current number of registrants) and the projected or desired number of registrants for the point in time. In this manner, the pace tracker 312 can determine if the target contest is below pace or above pace, and to what degree the target contest is below pace or above pace. The contest generator 304 can use this determination to determine a timing for generating a new contest. For example, if the target contest is below pace, the contest generator 304 may delay or restrict generating a new contest as described above. One or more embodiments of methods of using the pace tracker 312 are described herein with reference to FIG. 7A and FIG. 7B.

The pace tracker 312 can further rank contests based on respective pace statuses. For example, the pace tracker 312 can determine, for each contest of a plurality of contests, to what degree the contest is under-saturated or below pace (e.g. by how many participants the contest is below pace, or by a percentage difference between an "on pace" number of participants (e.g. the projected or desired number of participants) and the projected pace, either at the current time or at a future time (e.g. at close of registration)). The pace tracker 312 can determine a rank for each of the plurality of contests (or for a sub-set of the plurality of contests having being under-saturated or below pace to a degree that is equal to or greater than a threshold) based on the pace statuses. The pace tracker 312 can determine a high rank for a contests that is most under-saturated or below pace.

The contest display manager 313 can include components, subsystems, modules, scripts, applications, or one or more sets of computer-executable instructions and can be configured to manage display of a contest on a client device (such as a client 102). The contest display manager 313 can provide data corresponding to a layout of a contest display, such as a lobby 202 as shown in FIG. 2A.

The contest display manager 313 can determine a layout of the contest display that includes one or more predetermined locations for displaying contests based on projections or rankings determined by the pace tracker 312. For example, the contest display manager 313 can determine a layout that includes displaying, on a page or tab of the contest display, only contests that are below pace or that are below pace to a degree that is equal to or above a threshold, or displaying such below pace contests in a predetermined location (e.g. in a prominent position in the lobby, such as at the top or start of a list of contests), or can display such below-pace contests according to one or more features, such as a stylistic feature (e.g. a particular text style (which can specify a size, a font, underlining, bold, italics, or another style, and in some embodiments the particular text style is different than another style used in the contest display), a visual indicator associated with such below pace contests (e.g. a box, circle, or other visual indicator that surrounds or is otherwise positioned relative to the below pace contests), or any other appropriate feature.

The contest display manager 313 can determine a layout that includes prominently displaying (e.g. on a front page or tab of the display, or high up in a list of contests) contests based on a display score or a contest match score. The display score or match score may be determined by a contest recommendation system, such as the contest recommendation system 902 described herein in reference to FIG. 9. The contest recommendation system 902 may determine the display score or match score based on the projections or the rankings determined by the pace tracker 312 (e.g. may include an under-saturation score as a sub-score for a total contest match score). The contest display manager 313 may use rankings determined by the contest recommendation system 902 to determine the layout for the contest display. Thus, a contest that is determined to be below pace may be displayed more prominently than would otherwise be the case.

The historical contest DB 314 can include one or more data structures that store one or more historical contests 316. A historical contest 316 can be a contest for which registration is closed. For example, the historical contest DB 314 can store a historical contest 316a, 316b, 316c, or more historical contests. The historical contest 316a can include data 322, including contest-generating parameters 322a, context parameters 322b, and registrant-time data 322c. Each of the historical contests stored in the historical contest DB 314 can include contest-generating parameters, context parameters, and registrant-time data. The historical contest DB 314 is described in more detail below with respect to FIG. 4A.

The active contest DB 318 can include one or more data structures that store one or more active contests 320. An active contest 320 can be a contest for which registration is open, or a contest for which registration has not yet opened. For example, the active contest DB 318 can store an active contest 320a, 320b, 320c, or more active contests. The active contest 320a can include data 324, including contest-generating parameters 324a, context parameters 324b, and registrant-time data 324c. Each of the active contests stored in the active contest DB 318 can include contest-generating parameters, context parameters, and registrant-time data. The active contest DB 318 is described in more detail below with respect to FIG. 4B.

Figure 4A:
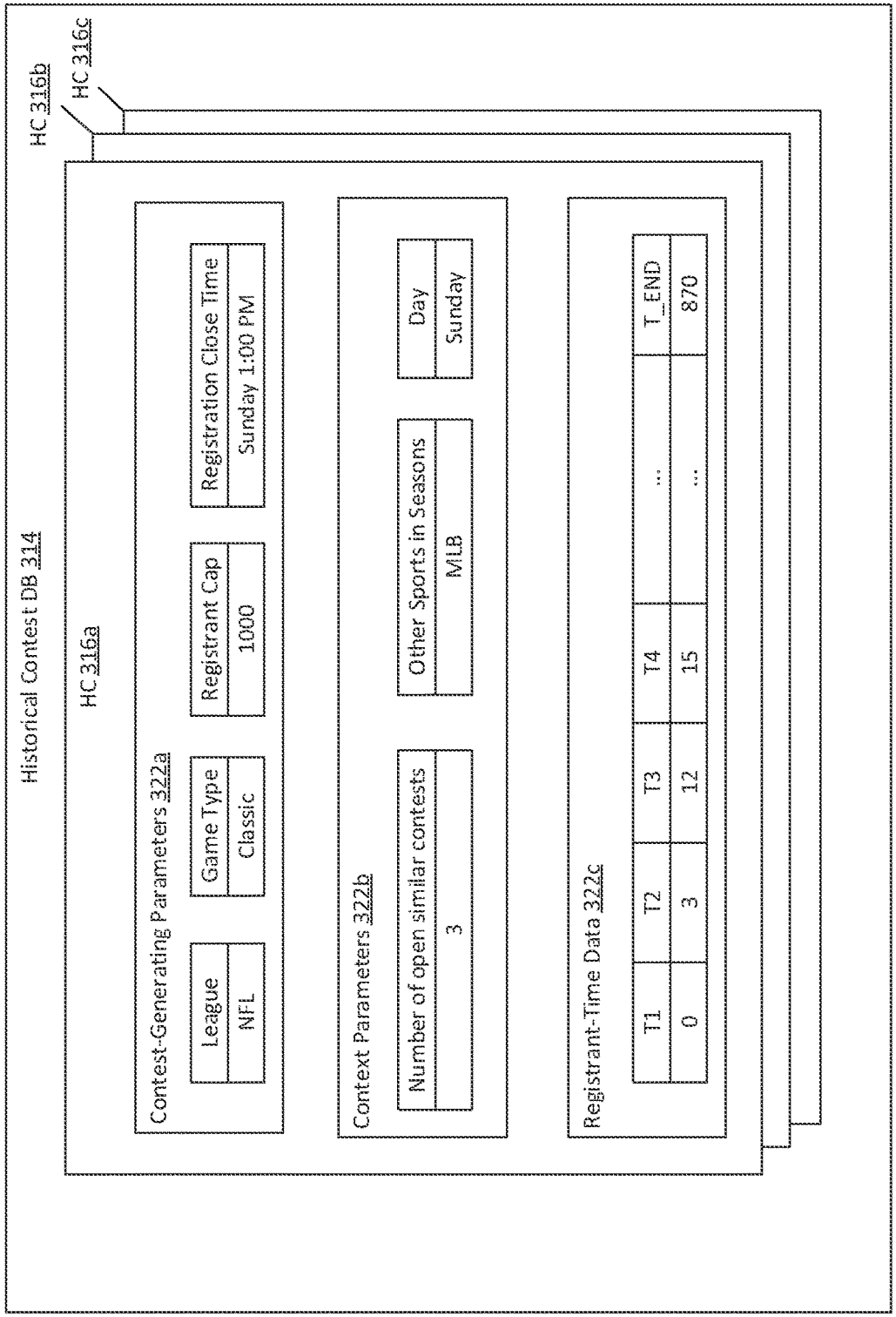
FIG. 4A is a block diagram depicting one or more embodiments of a historical contest database.

Referring now to FIG. 4A, FIG. 4A shows a historical contest DB 314 including a historical contest 316a, a historical contest 316b, and a historical contest 316c. The historical contest 316a includes data 322 including contest-generating parameters 322a, context parameters 322b, and registrant-time data 322c. The contest-generating parameters can be, or can be based on, any parameters used (e.g. by the contest generator 304) to generate the historical contest 316a. As described above, the contest-generating parameters can include, for example, one or more of a league, a game type, a registrant cap, one or more games, a registration close time, an entry fee, an eligibility specification requirement, a prize type, or any other parameters used for generating a contest.

The context parameters relate to a context for the historical contest 316a. The context can include, for example, whether sports other than the sport of the historical contest 316a were in season during the registration period of the historical contest 316a. If other sports were in session, the number of registrants for the historical contest 316a may have been depressed, and using a context parameter related to this to account for such information (e.g. by the registrant projector 310) would be useful. Another context parameter may indicate, for example, a day of the week on which registration for the historical contest 316a closed, or whether registration for the historical contest 316a closed on a weekend or on a weekday.

The context parameters can also relate to information related to other contests, such as a number of contests running concurrently with, or in close temporal proximity to (e.g. within one hour of, within 2 hours of, within 5 hours of, within one day of, within two days of, or within a week of) the historical contest 316a. Running concurrently with, or in close temporal proximity to, the historical contest 316a can refer to contests that have an overlapping registration period, or that have registration periods that are separated by a small amount of time (such as one hour, 2 hours, 5 hours, one day, two days, or one week). For example, such context parameters can include an average number of concurrent active contests during the registration period of the historical contest 316a, or an average number of concurrent active contests during a time period of interest within the registration period of the historical contest 316a (e.g. within the last hour of registration of the historical contest 316a, or at close of registration). These averages may be averages of contests determined to be similar to the historical contest 316a by the contest similarity score generator 308. Another context parameter may be an indicator of a number of registrants of contests running concurrently with, or in close temporal proximity to, the historical contest 316a.

The historical contest 316a further includes registrant-time data 324c. The registrant-time data 324c can include time—number-of-registrant pairs (pairs of associated data) indicating a number of registrants at a plurality of times T1 through T_END. T1 may correspond to a time at which registration of the historical contest 316a opened, and time T_END may correspond to a time at which registration of the historical contest 316a closed. The registrant-time data 324c may also include registrant profile parameters for the historical contest 316a.

Figure 4B:
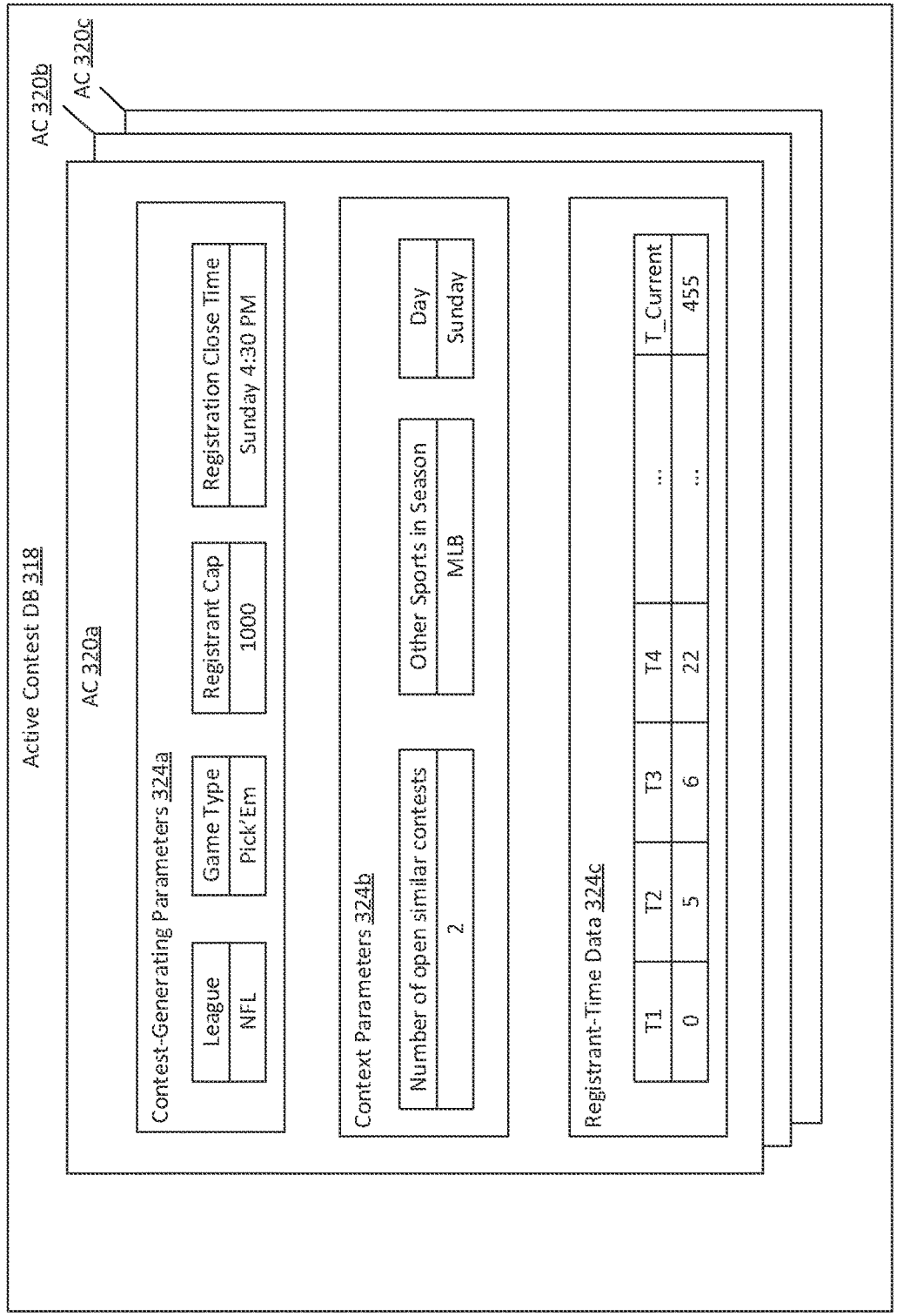
FIG. 4B is a block diagram depicting one or more embodiments of an active contest database.

Referring now to FIG. 4B, FIG. 4B shows an active contest DB 318 including an active contest 320a, an active contest 320b, and an active contest 320c. The active contest 320a include contest-generating parameters 324a, context parameters 324b, and registrant-time data 324c. The active contest DB 318 may include contests for which registration is currently open, or contests for which registration has not yet begun (and may not yet be presented in the lobby 202). The contest-generating parameters 324a, context parameters 324b, and registrant-time data 324c may be similar to the contest-generating parameters 322a, context parameters 322b, and registrant-time data 322c of the historical contest 316a, except that the registrant-time data 322c of the active contest 320a may only include time—number-of-registrant pairs up to a current time (T_Current), rather than up to T_END, as registration has not yet closed for the active contest 320a.

Referring now to FIG. 5, FIG. 5 shows an example embodiment of a process for generating a similarity score between a first contest and a second contest. This can be used to determine a set of first contests that are similar to a second (target) contest, and the registrant projector 310 can perform analysis using the set of similar first contests to project a number of registrants for the second contest, as described herein. The process can be performed by the contest similarity score generator 308. In a brief overview, the contest similarity score generator 308 can set a parameter index "n" to one, or some initial value (BLOCK 502). The contest similarity score generator 308 can select an nth parameter for a first contest (e.g. a historical or active contest), and an nth parameter for a second contest (e.g. a target contest) (BLOCK 504). The contest similarity score generator 308 can calculate a similarity between the parameter values of the nth parameter for the first contest and the nth parameter for the second contest (BLOCK 506). The contest similarity score generator 308 can apply a parameter weight to the calculated similarity, and can add the result to a total similarity score (BLOCK 508). The contest similarity score generator 308 can determine whether the index n is equal to N (a total number of parameters being considered by the contest similarity score generator 308) (BLOCK 510).

If the contest similarity score generator 308 determines that the index n is not equal to N, the process proceeds to BLOCK 512, and the contest similarity score generator 308 can then increment n, and the process can proceed to BLOCK 504. If the contest similarity score generator 308 determines that the index n is equal to N, the process proceeds to BLOCK 514, and the contest similarity score generator 308 can determine whether the similarity score is less than (or, in other embodiments, equal to) a threshold, such as a pre-determined threshold. If the contest similarity score generator 308 determines that the similarity score is below the threshold, the process proceeds to BLOCK 516, and the first contest is added to a sub-group of contests (a sub-group of the contests being analyzed) that are similar to the second (target) contest. The process then proceeds to BLOCK 518, and a next contest is analyzed for similarity with respect to the second contest, or the process may end. If, at BLOCK 514, the contest similarity score generator 308 determines that the similarity score is not below the threshold, the process proceeds directly to BLOCK 518, or ends.

In more detail, at BLOCK 504, the contest similarity score generator 308 can select an nth parameter of a first contest (e.g. a historical contest). The nth parameter may be any of the contest parameters described herein, such as, for example, a contest-generating parameter or a context parameter. The nth parameter may be a registrant profile parameter. The contest similarity score generator 308 may further select an nth parameter of a second contest. The nth parameter may correspond to the nth parameter of the first contest (e.g. may be the same parameter).

At BLOCK 506, the contest similarity score generator 308 may calculate a similarity between the value for the nth parameter of the first contest and the value for the nth parameter of the second contest. This similarity may be based on a direct similarity (e.g. if the parameter is an entry fee, the similarity may correspond to a difference between the respective entry fees of the first contest and the second contest), or may be a similarity determined in some other manner, such as by reference to a look-up table (LUT). The LUT may be accessible to the contest similarity score generator 308, and may describe a number of "similarity points" that correspond to parameter value pairs for particular parameters. For example, if the parameter is a day of the week, and the first parameter value correspond to Saturday and the second parameter value corresponds to Sunday, the LUT may indicate that a first number of similarity points corresponds to this difference in parameter values for the day-of-the-week parameter. If the first parameter value correspond to Wednesday and the second parameter value corresponds to Sunday, the LUT may indicate that a second number of similarity points smaller than the first number corresponds to this difference in parameter values for the day-of-the-week parameter, indicating a greater similarity between a Saturday-Sunday pair than between a Wednesday-Sunday pair. Parameter values may correspond to parameter value groups (e.g. to a "small entry fee" group, or to a "large entry fee" group), and similarities between corresponding groups may be determined rather than directly determining similarities between the parameter values.

At BLOCK 508, the contest similarity score generator 308 may apply a weight corresponding to the nth parameter to the similarity (e.g. to the similarity points) calculated at BLOCK 506. The weight may be, for example, a predetermined weight. The weight may be a weight determined by a machine learning algorithm trained on a set of contests (e.g. a set of contests including annotations indicating similarity between the contests). This can provide for weighing parameter value similarities according to the importance of the corresponding parameter, and can provide for an improved method of generating a similarity score.

As described above, at BLOCKs 514-516, the contest similarity score generator 308 may determine that a similarity score is greater than a pre-determined threshold, and responsive to this determination may assign the first contest to a sub-group, the sub-group including contests similar to the second contest. This sub-group of contests similar to the second contest can be used in subsequent analysis, as described herein. Using the sub-group of similar contests, rather than analyzing every contest for which data is stored, can provide for more efficient and less computer-resource-intensive analysis. For example, the registrant projector 310 may perform analysis on a group of contests to generate a projected number of registrants for the second contest. By limiting the analysis to only those contests that are similar to the second contest and omitting other contests, the registrant projector 310 may use less computing resources to perform the analysis.

Referring now to FIG. 6, FIG. 6 shows an example embodiment of a process for generating a projected registrant profile, and for projecting a number of registrants for a contest. The process can be performed by the registrant projector 310. In a brief overview, the registrant projector 310 can set an index "n" of contests similar to a target contest to 1 (or some other initial value) (BLOCK 602). The registrant projector 310 can select the nth similar contest of a group of similar contests (e.g. a sub-group of similar contests determined by the process depicted in FIG. 5) (BLOCK 604). The registrant projector 310 can determine a number M registrant profile parameters for the nth similar contest (BLOCK 606). The registrant projector 310 can determine whether the index n is equal to a total number of similar contest N (BLOCK 608). If the registrant projector 310 determines that the index n is not equal to a total number of similar contest N, the process proceeds to BLOCK 610, the registrant projector 310 increments the index n, and the process proceeds to BLOCK 604. If the registrant projector 310 determines that the index n is equal to the total number of similar contest N, the process proceeds to BLOCK 612, and the registrant projector 310 sets an index m of registrant profile parameters to 1 (or some other initial value). The registrant projector 310 can aggregate the respective mth registrant profile parameter values of the N similar contests to generate an mth registrant profile parameter value for the target contest (BLOCK 614). The registrant projector 310 can determine whether the index m is equal to the total number of registrant profile parameters M (BLOCK 616). If the registrant projector 310 determines that the index m is not equal to the total number of registrant profile parameters M, the process proceeds to BLOCK 618, the registrant projector 310 increments m, and the process proceeds to BLOCK 614. If the registrant projector 310 determines that the index m is equal to the total number of registrant profile parameters M, the process proceeds to BLOCK 620, and the registrant projector 310 can generate a projection of a number of registrants for the target contest at a time T, using the M generated registrant profile parameters.

In further detail, at BLOCK 604, the registrant projector 310 can select an nth similar contest from a group of contests determined by the contest similarity score generator 308 to be similar to the target contest. At BLOCK 606, registrant projector 310 can determine registrant profile parameters for the nth similar contest. The registrant profile parameters for the nth similar contest can be generated dynamically during the process depicted in FIG. 6, or can be retrieved by the registrant projector 310 (e.g. from a database, such as the historical DB 314). The registrant profile parameters for the nth similar contest can be generated as described above with reference to FIG. 3.

At BLOCK 614, the registrant projector 310 can aggregate the respective mth registrant profile parameter values of the N similar contests to generate an mth registrant profile parameter value for the target contest. The registrant projector 310 can aggregate the respective mth registrant profile parameters based on weights. For example, the weights can be, or can be based on, similarity scores calculated by the contest similarity score generator 308 for the target contest—nth similar contest pairs. In this way, contests that are more similar to the target contest than are other contests are accorded more weight in the determination of registrant profile parameter values for the target contest, which may lead to a more accurate projection. The weights can be calculated using a machine-learning algorithm (e.g. a machine-learning algorithm that implements a similarity score as a feature). Such a machine-learning algorithm can, for example, be trained on an annotated data set that includes complete registrant-time data for a plurality of contests as well as corresponding similarity scores. The weights determined by the machine-learning algorithm can, when used in the process shown in FIG. 6, provide for determining accurate registrant profile parameters for a target contest and for an accurate projection of a number of registrants for the target contest at a time T. At BLOCK 620, the registrant projector 310 can project a number of registrants for the target contest at a time T, using the M generated registrant profile parameter values for the target contest. For example, the registrant projector 310 can determine an equation describing a number of registrants for the target contest as a function of time based on the M generated registrant profile parameters for the target contest. This equation can be used to project the number of registrants for the target contest at an arbitrary time.

Figure 7A:
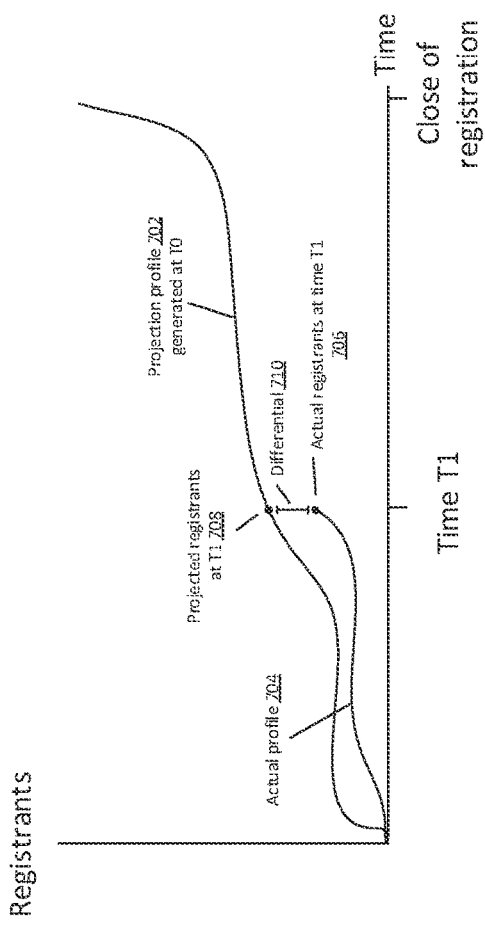
FIG. 7A and FIG. 7B show one or more embodiments of a projected registrant profile and an actual registrant profile at a time T1 and a time T2, respectively.

Referring now to FIG. 7A, FIG. 7A shows a projection profile 702 for an active target contest. The projection profile 702 can in the depicted example is generated at time T0 (e.g. at an opening of registration for the active target contest). The projection profile 702 shows a projected number of registrants for the target contest as a function of time, for a plurality of times up until a time at which registration closes. FIG. 7A also shows an actual profile 704, which shows an actual number of registrants for the target contest, up to a time T1 (e.g. a current time). A differential 710 shows a difference between the projected number of registrants at time T1 708 and the actual number of registrants at time T1 (706). As can be seen, the actual number of registrants at time T1 is below the projected number. This may indicate that the target contest (and may imply that other active contests) are under-saturated. The pace tracker 312 may determine the differential 710 at a time T1. The pace tracker 312 may determine the differential 710 at a time T1 based on a schedule for pace-tracking, such as checking every predetermined amount of time (e.g. by checking every second, every two seconds, or every three second, or any appropriate amount of time), or such as checking at one or more predetermined times). The pace tracker 312 may determine that the differential is above a threshold, and based on this determination, the pace tracker 312 may instruct the contest generator 304 to restrict or to delay generation of a new contest (e.g. by interrupting or revising a schedule for generating new contests). Alternatively, the contest generator 304 may request that the pace tracker 312 determine the differential 710 as part of a policy for generating a new contest, and the contest generator 304 may determine to restrict or delay generation of a new contest based on the differential 710 being above a threshold. The contest generator 304 may request that the pace tracker 312 determine a differential for a plurality of contests to, for example, generate a total under-saturation score, and may restrict or delay generation of a new contest based on the total under-saturation score. This can help to conserve computer resources, and may avoid opening, maintaining and updating unnecessary contests. An example embodiment of this process is described herein in reference to FIG. 8B.

Figure 7B:
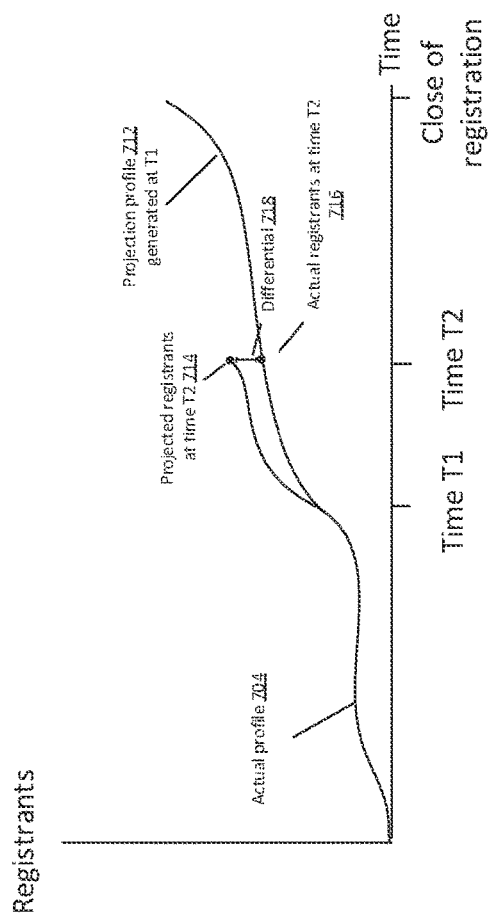

Referring now to FIG. 7B, FIG. 7B shows a projection profile 712 generated at the time T1 and an updated actual profile 704 at a time T2. The projection profile 712 can be determine by the registrant projector 310 at the time T1 or based on information determined at the time T1. The projection profile 712 can represent an updated projection profile for the active target contest. The projection profile 712 can be updated every predetermined amount of time (e.g. by checking every second, every two seconds, or every three second, or any appropriate amount of time), or by updating at one or more predetermined times. The projection profile 712 can be generated at the time T1 based on updated registrant profile parameter values. The current registrant profile parameter values may change if the contest similarity score generator 308 makes updated determinations as to which contests are "similar" to the target contest (based on updated registrant-time data for the target contest), and the registrant projector 310 may thus determine updated registrant profile parameter for the target contest based on the updated set of similar contests to generate an updated projected final number of registrants. The registrant profile parameter values can be updated using Kalman filtering or linear quadratic estimation. The registrant profile parameter values can be updated based on a weighted average of older registrant profile parameters (e.g. determined at the time T0) and new registrant profile parameters (e.g. determined at the time T1). The weighs may be based on (e.g. proportional to) a differential between actual registrants and projected registrants for the respective times. For example, the registrant profile parameters determined at time T0 may be weighted based on the differential 710, and the registrant profile parameters determined at time T1 may be weighted based on the differential 718, and a weighted average of these registrant profile parameters may be used as the updated registrant profile parameters. In this manner, the projections can be performed dynamically to project whether one or more active contests will be under-saturated at close of registration.

FIG. 7B also shows a differential 718 between a projected number of registrants 714 at time T2 and an actual number of registrants 716 at time T2. The differential 718 at time T2 is smaller than the differential 710 at time T1, showing that the saturation of the target contest is improved (e.g. as a result of the contest generator 304 determining to restrict or delay generation of a new contest at time T1). The pace tracker 312 may determine that the differential 718 is below a threshold, and based on this determination the contest generator 304 may generate a new contest (e.g. according to a schedule or policy for generating new contests).

In other embodiments, a desired number of final registrants (e.g. at close of registration) is compared to a current projected final number of registrants determined based on current registrant profile parameter values, and the pace tracker 312 determines a differential between the desired number of final registrants and the current projected final number of registrants. If this differential is above a threshold, the contest generator 304 may restrict or to delay generation of a new contest (e.g. in any of the manners described above).

C. Systems and Methods for Generating Contest Recommendations to Direct Registrations Across Contests The following description relates to one or more systems and methods of generating a contest recommendation for a user. Contest recommendations can be generated to direct registrations across contests, and to optimize registrant dispersion to conserve computing resources. For example, a contest recommendation can be generated to direct one or more registrants to a contest that is projected to be undersaturated. This can provide for improved allocation of computing resources by directing registrants to a smaller number of contests, rather than having registrants disperse across a larger number of contests. Generation and/or maintenance of a contest may involve a computing resource cost, and directing registrants to a smaller number of contests can provide for a better computing resource per user ratio, which can represent an improvement in computing resource allocation.

The contest management system 206 may include components, subsystems, modules, scripts, applications, or one or more sets of computer-executable instructions configured to prioritize contests included in a plurality of contests for the user and generate a content item corresponding to one of the contests to provide to the user, and may implement any of the systems and methods described herein to do so.

Referring now to FIG. 8A, FIG. 8A shows a user history 802 of a user profile. The user history 802 can include one or more historical contests that are associated with a user (e.g. in which a user has participated). The historical contests can be contests in which the user has registered and which have not yet ended, or can be contests that have ended. The user history 802 shows three contests C1', C2', and C3' by way of example, but any number of contests can be included in a user history. The contest may be associated with information including values for parameters (e.g. any parameters described herein, including contest-generating parameters and context parameters). The user history 802 includes a parameter value for a "sports" parameter and a parameter value for a "style" parameter.

FIG. 8B shows active contests 804. Active contests 804 can include contests open for registration. The active contests 804 can be included in a database accessible to the contest management system 206. The active contests 804 may be contests for which registration is open, or for which registration is possible. Although the active contests 804 shown in FIG. 8A include three contests C1 through C3, any number of active contests 804 can be included.

The active contests 804 may include, for one or more of the contests C1 through C3 (e.g. for each contest), a sports parameter value and a contest style parameter value, and may include other information corresponding to the contests C1 through C3 (e.g. information corresponding to any of the parameters described herein). The active contests 804 may also include a similarity parameter value and a similarity rank that are specific to a user or a set of users. The similarity parameter value may indicate whether the contest is considered "similar" to contests that user or set of users have participated in or are registered for. The similarity rank may indicate how similar the contest is, relative to other similar contests. As shown in FIG. 8B, the contests C2 and C3 are "similar" contests for a user of interest. This can be determined by matching parameter values of the contests C2 and C3 to the parameter values of the contests included in the user history 802, or in any other appropriate manner. Systems and methods for making this determination are provided below. The contests C2 and C3 may also be ranked, along with other similar contests (not shown), based on their similarity to contests included in the user's history. The contest C2 has a highest rank (rank 1), and may be identified as a similar contest 806 based on this rank.

Figure 8C:
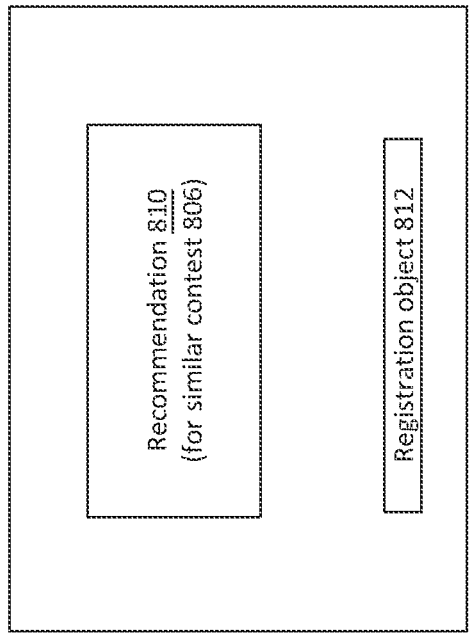
FIG. 8C depicts one or more embodiments of a content item.

FIG. 8C shows a content item 808. The content item 808 can be displayed on a client device (e.g. a client device associated with the user profile that includes the user history 802), and data for displaying, rendering, or otherwise providing the content item 808 can be transmitted by the contest management system 206 to the client device associated with the user profile. The contest management system 206 may generate the content item 908 or may request that another system generate the content item 908. The content item 808 can include a recommendation 810 and a registration object 812. The recommendation 810 can include a media item (e.g. any combination of text, image, video, or user-interactive content), and the media item can reference the similar contest 806. For example, the recommendation 810 can include text that recommends the similar contest 806 to the user. The registration object 812 can include an object that the user can interact with to facilitate registration in the similar contest 806. For example, the registration object 812 can include a user-selectable hyperlink that initiates a process to download a webpage, or initiate a process of an application, for registering for the similar contest 806.

Figure 9:
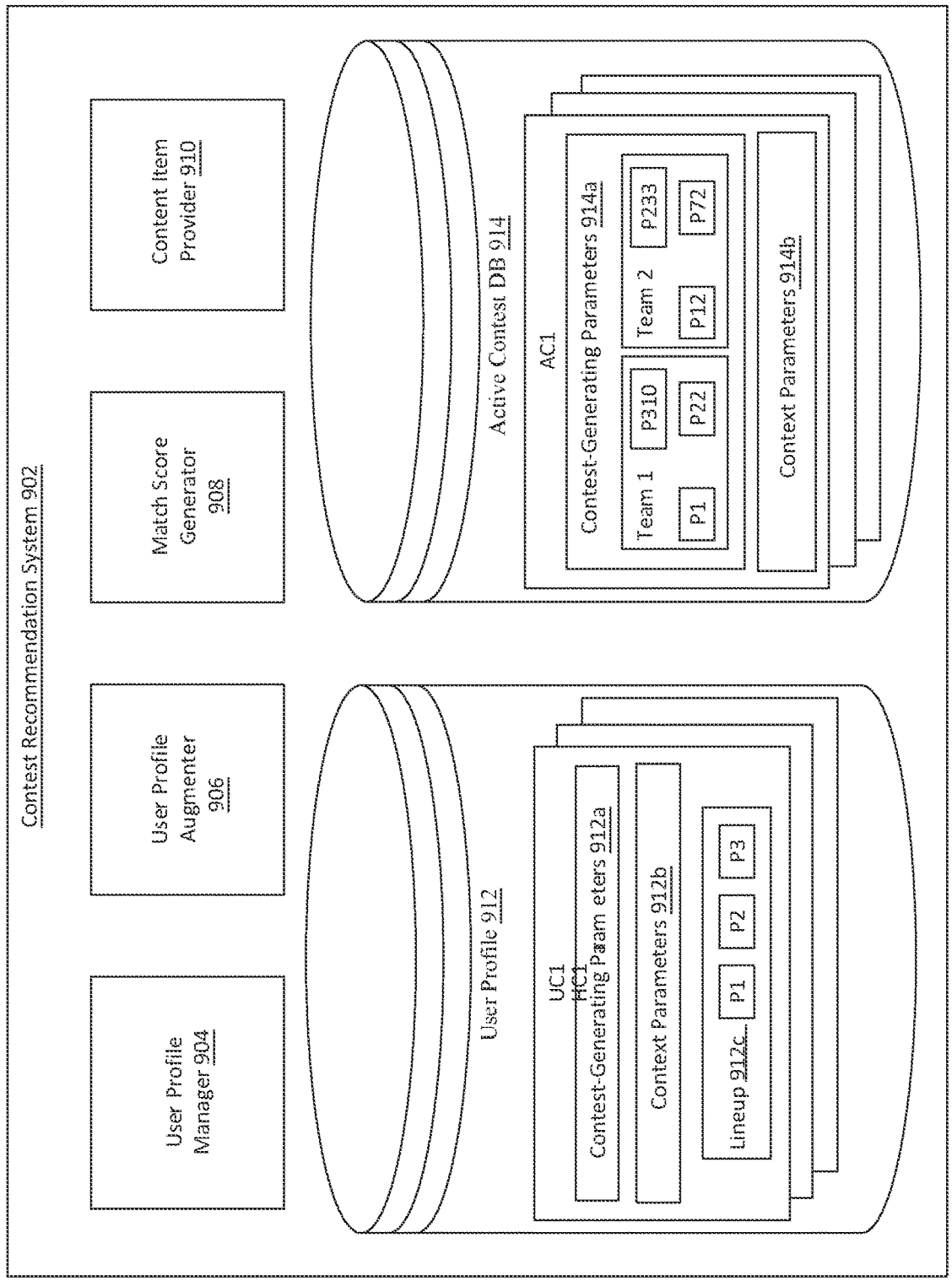
FIG. 9 is a block diagram depicting one or more embodiments of a contest recommendation system.

Referring now to FIG. 9, FIG. 9 is a block diagram showing an embodiment of a contest recommendation system 902 that can be included in the contest management system 206. The contest recommendation system 902 can include or be executed on one or more servers, such as the servers 106 shown in FIG. 1A. The contest recommendation system 902 can include one or more applications, services, routines, servers, daemons, or other executable logics for generating a contest, including one or more of a user profile manager 904, a user profile augmenter 906, a match score generator 908, and a content item provider 910. The contest recommendation system 902 can also include, access, maintain or manage one or more data structures, including but not limited to a user profile 912 and an active contest DB 914.

The user profile 912 may include historical user contests that include contests that have ended, and contests in which the user is registered but have not ended. Each historical user contest, such as the user contest 1 (UC1) shown in FIG. 9, can include contest-generating parameters 912*a* and context parameters 912*b*. The contest-generating parameters 912*a* and context parameters 912*b* can be similar to the contest-generating parameters 322*a* and context parameters 322*b* shown and described with respect to FIG. 3. One or more historical user contests can include a lineup 912*c* associated with the one or more user contests. The lineup 912*c* can include a list of one or more players P1, P2, P3 (or any number of players) associated with the historical user contest. For example, the contest may be a fantasy football contest, and the lineup 912*c* may include players that were drafted, activated, or played by the user in the historical user contest. The lineup 912*c* may include players that are otherwise associated with the contest, including, for example, players that are part of one or more teams associated with the historical user contest.

The active contest DB 914 can include one or more active contests, including the active contest 1 (AC1) shown in FIG. 9. The active contests can be contests for which registration is still open. Each contest in the active contest DB 914 can include contest-generating parameters 914*a* (e.g. any contest-generating parameters described herein), and context parameters 914b (e.g. any context parameters described herein). In some embodiments, the contests included in the active contest DB 914 may include or otherwise be associated with a list of players that users can select from to generate their lineups. In some embodiments, the players can be associated with one or more teams.

The user profile manager 904 can include components, subsystems, modules, scripts, applications, or one or more sets of computer-executable instructions and can be configured to manager a user profile 912. The user profile manager 904 can generate, maintain, or update the user profile 912. The user profile manager 904 can maintain the user profile 912 by, for example, adding historical user contests to the user profile 912 (and corresponding information for the historical user contest) as the user enters contests, or as contests in which the user is entered end. The user profile manager 904 can determine statistical features related to the parameter values (e.g. for contest-generating parameters 912a and context parameters 912b, and/or for one or more players of the lineup 912c) of the user historical contests of the user profile 912, and can provide those statistical features to the match score generator 908, or to any other component of the contest recommendation system 902.

The user profile augmenter 906 can include components, subsystems, modules, scripts, applications, or one or more sets of computer-executable instructions for augmenting a user profile. In some embodiments, the user profile 912 does not include some desired information. For example, the user profile 912 may omit a historical contest having a parameter of interest, or may include an insufficient number of historical contests that include the parameter of interest to satisfy a desired sample size. For example, the parameter of interest may be a sport. The user profile manager 904 may determine a parameter value having a highest incidence in the user profile 912 for a set of parameters including the sport parameter, the incidence being higher than a predetermined threshold (e.g. to ensure a satisfactory sample size), and may report that parameter value to the match score generator 908 for determining a similar contest. The user profile 912 may only include a small number of historical user contests, such that no sport has an incidence higher than the predetermined threshold. In order to determine a similar contest in the active contest DB 914 similar to the contests included in the user profile 912, the user profile augmenter 906 can augment the user profile. The user profile augmenter 906 can augment the user profile by performing operations that include determining expanded statistics related to a set of parameter values for the user profile 912, or categorizing the user profile 912 as belonging to a set of similar user profiles, and determining statistical features based on an expanded set of parameter values that corresponds to the set of similar user profiles.

The user profile augmenter 906 can augment the user profile by determining expanded statistical features related to a set of parameter values for the user profile 912. For example, to continue with the example provided above, the user profile augmenter 906 can determine a sport having a highest incidence for the user profile 912 by inferring or predicting the statistical feature based on similar user profiles. In some embodiments, this is implemented using collaborative filtering.

The user profile augmenter 906 can augment the user profile 912 by adding to the target profile, or associating with the user profile 912, a list of similar user profiles. For example, the user profile augmenter 906 can implement a clustering algorithm on a set of user profiles to generate clusters of similar user profiles, and can use the clustering algorithm to determine to which cluster the user profile 912 belongs. In some embodiments, the user profile augmenter 906 can determine a set of user profiles similar to the user profile 912 based on matching features of historical contests included in the user profile 912 and features of historical contests included in the other user profiles.

The user profile augmenter 906 can augment the user profile by categorizing the user profile 912 as belonging to a set of similar user profiles, and determining statistics based on an expanded set of parameter values that corresponds to the set of similar user profiles. The user profile 912 may be so-clustered, and may be tagged as belonging to a particular set of similar users. The user profile manager 904 may determine statistics for the particular set of similar users, and may assign those statistics to the user profile 912. For example, the user profile manager 904 can perform any of the operations described herein using historical contests (and associated information) included in any of the user profiles of the particular set of similar user profiles. The user profile manager 904 may weigh the user profile 912 more heavily than other user profiles when determining the statistics. This can provide for an augmented user profile that can be used by the match score generator 908 to determine similar contests.

The match score generator 908 can include components, subsystems, modules, scripts, applications, or one or more sets of computer-executable instructions for determining a match score for a candidate contest. The match score can be for a user profile (or for an augmented user profile—for brevity, the phrase "user profile" may be used herein to refer to both a user profile and/or an augmented user profile), and can correspond to a determined similarity between a user profile and a candidate active contest included in the active contest DB 914. The match score generator 908 can determine a total contest match score for a candidate active contest. The total contest match score can be an aggregation of sub-scores. The sub-scores can include, for example, a player match score (e.g. a score that corresponds to matching between one or more players included in, or otherwise associated with, the user profile and one or more players included in, or otherwise associated with, the candidate active contest), a team-match score (e.g. a score that corresponds to matching between one or more teams included in, or otherwise associated with, the user profile and one or more teams included in, or otherwise associated with, the candidate active contest), or a match score for any parameter described herein. The match score generator 908 can determine weights for contest parameters, and the match score may be a weighted count of matching parameter values between the user profile and the candidate contest using the generated weights. Thus, the match score generator 908 can determine one or more sub-scores, and can aggregate the sub-scores to determine a total match score for the candidate contest relative to the user profile.

In some embodiments, the match score generator 908 can generate a total contest match score by aggregating a content-based match score and a collaborative-filtering-based match score. A content-based match score can be a match score based on a determination of a similarity between one or more features of historical contests included in the user profile 912 and features of active contests included in the active contest DB 914. Such a similarity can be determined, for example, by the contest similarity score generator 308. This can provide for matching the user profile 912 with active contests that have preferred features.

A collaborative-filtering-based match score can be a match score based on a determination of a similarity between the user profile 912 and other user profiles. For example, the collaborative-filtering-based match score can be based on a determination that one or more similar user profiles (e.g. determined to be similar as described above, such as via clustering) are currently registered for one or more active contests. Each candidate active contest being analyzed can be awarded match score points based on a weighted sum of similar user profiles that are currently registered for the active contest (e.g. weights can be implemented based on a degree of similarity of the similar user profiles to the user profile 912). In some embodiments, collaborative-filtering can be implemented to augment the user profile 912 to determine new preferences for features (e.g. as described above), and the match score generator 908 can generate a match score based on those new preferences.

In some embodiments either the collaborative-filtering-based match score or the content-based match score can be implemented independently. For example, the match score generator 908 can generate a total contest match score without implementing the content-based match score (e.g. only implementing the collaborative-filtering-based match score), or the match score generator 908 can generate a total contest match score without implementing the collaborative-filtering-based match score (e.g. only implementing the content-based match score). In some embodiments, the collaborative-filtering-based match score and the content-based match score can be implemented in a hybrid manner. For example, each of a collaborative-filtering-based match score and a content filtering-based match score can constitute sub-scores for a total contest match score and can be aggregated to generate the total contest match score. The aggregation may be a weighted average based on predetermined weights. The weights may be tuned (e.g. determined) to correspond to a preference for a "macro" based approach (e.g. by more heavily weighing the collaborative-filtering-based, which can be based on preferences for sets of similar users) or to correspond to a preference for a "micro" based approach (e.g. by more heavily weighing the content-based match score, which can be based on preferences particular to the user profile 912). The weights may be determined based on solicited feedback regarding the content recommendation system 902 or outputs thereof.

The match score generator 908 can determine an under-saturation score for the candidate contest. The under-saturation score can be based on an under-saturation count or under-saturation value determined by the pace tracker 312 (e.g. using the method shown in FIG. 8B). Thus, the under-saturation score can correspond to a degree of projected under-saturation for the candidate contest. Some embodiments provide for assigning a high under-saturation score to candidate contests having a high under-saturation count or value. Some embodiments provide for assigning a small under-saturation score to candidate contests that have high under-saturation counts or values (which it may be difficult or impossible to correct in a cost-effective or efficient manner) and/or for candidate contests that have a low or negative under-saturation count or value (which may be deemed to be not significantly under-saturated), and for assigning a high under-saturation score to a candidate contest having a saturation count or value falling within a "sweet spot" of readily correctable under-saturation. In some embodiments, the under-saturation score can be determined based on an under-saturation count or value's proximity to, or difference from, a predetermined value, or based on whether the under-saturation count or value falling within a predetermined range of values (a "sweet spot" range of values).

In some embodiments, the under-saturation score can be a sub-score that is aggregated with other sub-scores by the match score generator 908 to determine the total match score for the candidate contest relative to the user profile. In some embodiments, the under-saturation score can be used by the match score generator 908 to rank candidate contests or similar contests, as described below.

The match score generator 908 can determine a match score (e.g. a total match score, which can be a match score based on an aggregation of sub-scores including the under-saturation score) for each of a plurality of candidate active contests, and can generate a ranking of candidate contests based on the match scores. In some embodiments, the under-saturation score is used in the determination of the total match score (e.g. as a sub-score). In some embodiment, the under-saturation score may not be used in the determination of the total match score. The match score generator 908 may determine a set of candidate contests (e.g. all of the candidate contests, or a smaller set of candidate contests that satisfy one or more predetermined conditions (such as having a match score above a predetermined threshold)), and the match score generator 908 may rank the set of candidate contests based on the under-saturation score. For example, the match score generator 908 may rank the candidate contests of the set of candidate contests in descending order from highest under-saturation score to lowest under-saturation score, or may employ any other appropriate ranking policy.

By incorporating the under-saturation score into the ranking the candidate contests (e.g. as a sub-score of the total match score and/or in the final ranking), the content item provider 910 can generate or transmit or request content items that recommend under-saturated contests to a user associated with a user profile, the under-saturated contests being "similar" to the user profile of the user, as described herein. Thus the content item provider 910 can provide recommendations for relevant and under-saturated contests to a user. This can provide for improved allocation of computing resources by directing registrants to a smaller number of contests including under-saturated contests, rather than having registrants disperse across a larger number of contests which can involve allocation of computing resources to all of the larger number of contests. Generation and/or maintenance of a contest may involve a computing resource cost, and directing registrants to the smaller number of contests can provide for a better computing resource per user ratio, which can represent an improvement in computing resource allocation.

The match score generator 908 can determine that the candidate contest is ranked higher than a predetermined number, and can responsively tag the candidate contest as "similar" to the user profile. The match score generator 908 can determine that a match score for a candidate contest is above a predetermined threshold, and can responsively tag the candidate contest as "similar" to the user profile. In some embodiments, the match score between a user profile and an active contest indicates a level of relevance of the active contest to a user of the user profile. In some embodiments, the match score between a user profile and an active contest indicates a likelihood that a user of the user profile is likely to register for the active contest.

The content item provider 910 can include components, subsystems, modules, scripts, applications, or one or more sets of computer-executable instructions for providing a content item (such as the content item 902) to a client device. The content item can include a reference to one or more contests that have a match score that satisfies a predetermined condition to a user profile associated with the client device. Such contests may be referred to herein as "similar" contests. For example, the content item provider 910 can provide data for displaying or rendering the content item, or can instruct another system to provide such data. In some embodiments, the content item can be displayed with reference to a lobby 202 provided to the client device, and the content item provider 910 can determine to include similar contests in the lobby 202 (e.g. the similar contests can be shown in a predetermined location in a user interface displaying the lobby 202).

The content item can include a reference to (e.g. can include a reference included in a text, an image, a video, a hyperlink, an interactive object for initializing an application, or another media item) the similar contest. The reference may have one or more features. The features can include, for example, a stylistic feature (e.g. a particular text style (which can specify a size, a font, underlining, bold, italics, or another style, and in some embodiments the style can be different than another style used in the media item)), a predetermined location in the media item or a location defined relative to another object of the media item, a visual indicator associated with the reference to the similar contest (e.g. a box, circle, or other visual indicator that surrounds or is otherwise positioned relative to the reference), or any other appropriate feature.

The content item can include a hyperlink or interactive object for initializing an application that, when executed, can cause the client device to display a lobby (e.g. such as the lobby 202), and the lobby can display one or more similar contests according to one or more rules. For example, the lobby may display, on a page or tab of the lobby, similar contests (e.g. only similar contests), or may display the similar contests in a predetermined location (e.g. in a prominent position in the lobby, such as at the top or start of a list of contests), or can display the similar contest according to one or more features, such as a stylistic feature (e.g. a particular text style (which can specify a size, a font, underlining, bold, italics, or another style, and in some embodiments the style is different than the another style used in the lobby), a visual indicator associated with the reference to the similar contest (e.g. a box, circle, or other visual indicator that surrounds or is otherwise positioned relative to the reference), or any other appropriate feature.

D. Systems and Methods for Generating a Personalized Lobby Interface Based on Contest Attributes and User Attributes The following description relates to one or more systems and methods for generating a personalized lobby including contests based on contest attributes and user attributes for one or more users of a contest management system. The contest management system can generate, execute and maintain a plurality of contests, such as but not limited to, fantasy sports contests and betting contests (e.g., poker, card games, etc.). Further, the contest management system can maintain a plurality of user profiles with each of the user profiles associated with at least one user. To provide content and/or recommendations to one or user profiles, the contest management system can create one or more personalized lobbies for each of the user profiles. The personalized lobbies can display one or more contests selected by the contest management system that a user associated with the respective user profile may be interested in based in part on their respective profile attributes and/or contest history.

The contest can arranged within each of the personalized lobby based on a variety of different parameters, such as but not limited to, a likelihood a user will participate in the contest, pacing parameters of the respective contest, and/or rank values. In some embodiments, the contest management system can provide the personalized lobbies to one or more devices associated with the respective user profiles.

Figure 10:
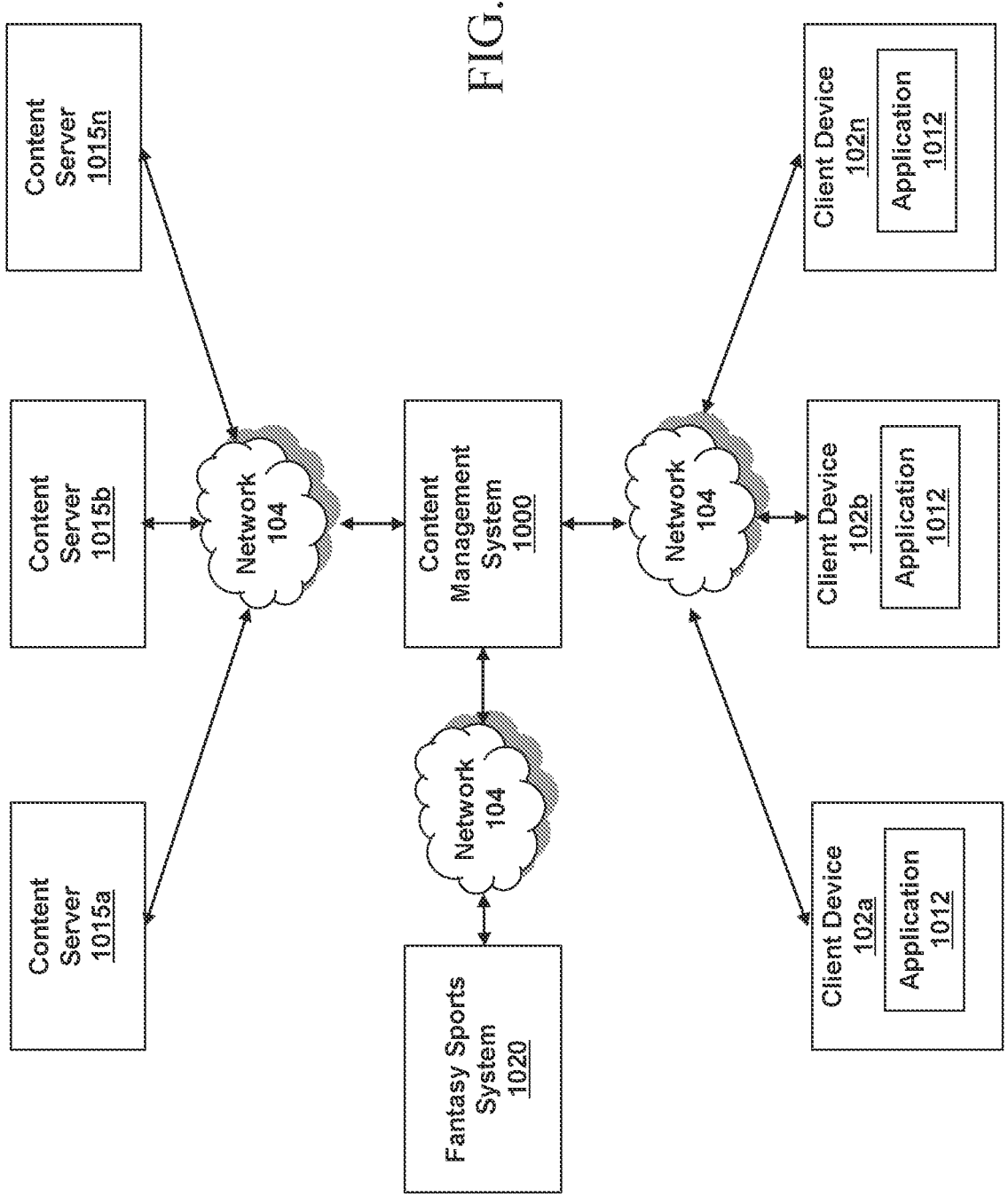
FIG. 10 is a block diagram depicting an embodiment of a content management environment including a content management system in communication with a plurality of content servers and a plurality of client devices executing application instances of the content management system.

Now referring to FIG. 10, a block diagram depicting an embodiment of a content management environment including a content management system 1000 in communication with a plurality of content servers 1015a-1015n and a plurality of client devices 102a-102b executing application 1012 instances of the content management system is shown. The content management system 1000 can be the same as or substantially similar to the contest management system 206 of FIG. 1C. For example, the content management system 1000 can include contest ranking system 302 of FIG. 3 and contest recommendation system 902 of FIG. 9. The content management system 1000 can identify or select one or more contests from a plurality of contests to be provided to one or users of a plurality of users.

The content management environment includes a content management system 1000, a plurality of client devices 102a-102n (generally referred to herein as client device 102) executing application 1012, a plurality of content servers 1015a-1015n (generally referred to herein as content server 1015) and one or more fantasy sports systems 1020. The content management system 1000, the plurality of content servers 1015 and the fantasy sports system 1020 are similar to or can execute on servers similar to the servers 106a-106n shown in FIG. 1A, while the client devices 102a-102n are similar to the devices 102a-102n shown in FIG. 1A.

The content management system 1000 may be communicatively coupled to each of the content servers 1015 via a first network, such as the network 104. The content management system 1000 may be communicatively coupled to each of the client devices 102 via a second network, such as network 104. The content management system 1000 may also be communicatively coupled to the fantasy sports system 1020 via a third network, such as the network 104. The first network, second network and the third network can be the same network or form part of the same network. In some embodiments, the first network, second network and the third network can also be different networks. In some embodiments, the content management system 1000 may communicate with the application 1012 executing on each of the client devices 102 via web socket connections established between the content management system 1000 and the application 1012. The application 1012 can be an application configured to communicate with the content management system 1000. In some embodiments, the application 1012 can be a web browser executing on the client device 102. In some embodiments, the application 1012 can be a native application executing on the client device 102.

One or more of the content servers 1015 can be configured to provide content items to the content management system 1000. In some embodiments, the content servers 1015 can be web servers or other types of content servers that are configured to provide content items to the content management system 1000. The content servers 1015 can include social media servers, for instance, TWITTER. In some embodiments, at least one of the content servers 1015 provides real-time score updates to sporting events. In some embodiments, at least one of the content servers 1015 can be a server hosting or providing news content. In some embodiments, the content server 1015 can be a server that an administrator of the content management system 1000 has included in a whitelist of content servers 1015.

As described above, the content management system 1000 can be communicatively coupled to one or more fantasy sports system 1020. The fantasy sports system 1020 can be configured to host, manage, maintain or provide contests for fantasy sports. The fantasy sports system 1020 can be configured to receive fantasy lineups from users of the fantasy sports system 1020 as submissions for contests hosted by the fantasy sports system. Each fantasy lineup is created for a particular contest and can include a list of players selected by the user. In some embodiments, the fantasy lineup becomes active once at least one sporting event for the fantasy sports contest begins and can expire when all of the sporting events for the fantasy sports contest end. Users of the fantasy sports system 1020 can submit multiple fantasy lineups for any given contest. Moreover, users of the fantasy sports system 1020 can play in multiple contests at a given time.

The content management system 1000 can maintain one or more connections with the fantasy sports system 1020. In some embodiments, the content management system 1000 can establish and maintain persistent connections with the servers of the one or more fantasy sports systems 1020 to receive information related to users of the fantasy sports systems 1020. In some embodiments, the connections can be web socket connections.

The content management system 1000 can receive one or more requests from one or more of the client devices 102 for content, contests or other forms of data corresponding to the fantasy sports system 1020. For example, in some embodiments, the content management system 1000 can receive a request from at least one of the client devices 102 for one or more contents from a plurality of contests executed on the fantasy sports system 1020.

Each of the client devices 102 can be associated with one or more users having user profiles maintained by the content management system 1000. Thus, the client devices 102 can be associated with one or more user profiles maintained by the content management system 1000. The content management system 1000 can identify the client device 102 that the request came from and one or more user profiles associated with the client device 102. In some embodiments, the request can include an identifier indicating the client device 102 the request came from and the user profile the request came from. The request may include profile attributes of the user profile and/or contest attributes for contests the user prolife the user profile would like to receive more information about. The user profile may include an activity profile and one or more profile attributes, as will be described in greater detail below.

Figure 11:
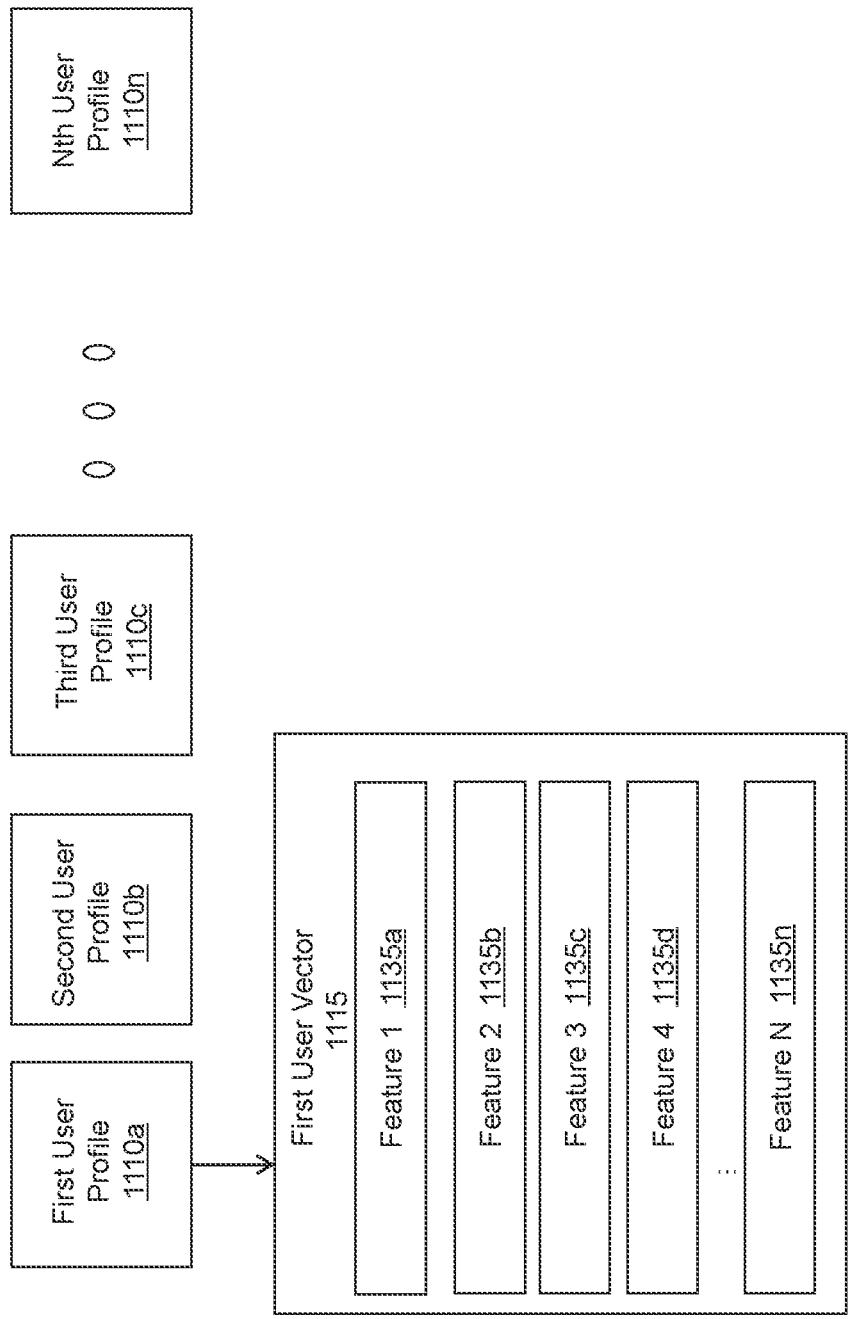
FIG. 11 depicts one or more embodiments of a multidimensional user vector generated for a first user profile.

Now referring to FIG. 11, FIG. 11 shows a block diagram identifying a plurality of user profiles 1110*a-n* and a multidimensional user vector 1115 (hereinafter "user vector 1115"). The first user profile can correspond to a first user of a fantasy sports platform, which can be executed by one or more processors. Each user profile can correspond to a respective user of the fantasy sports platform.

In the illustrative embodiment of FIG. 11, the user vector 1115 can be a first user vector 1115 generated based on the first user profile 1110*a*. The first user vector 1115 includes one or more features 1135*a*-1135*n*. The features 1135*a*-1135*n* correspond to player attributes, contest attributes or a combination of both associated with each user profile linked in the user vector 1115. The player attributes can include one or more of the following: a name, a sport category, a location, a team value, a position value, a price parameter or one or more future contests specific to the respective player. The contest attributes can include one or more of the following: a sport category, a price parameter, a prize parameter, a registrant threshold, a registrant limit, a current registrant count, a day value, a time value, a duration value, a contest type, and an experience level. In addition, the features 1135*a*-1135*n* can correspond to other attributes associated with a user profile, such as a user device associated with the profile, geographical location associated with the profile, preferences associated with the profile, activities associated with the profile, interests associated with the profile, among others. The features 1135 can be based on activity that can be detected by an application executing on the user device associated with the profile, including responses to notifications provided to the user device, content provided to the user device and other activity performed on the user device.

Each of the features 1135*a*-1135*n* can be assigned a value that can be determined in part on a frequency value indicating a frequency that the respective feature appears in the user profiles linked in the first user vector 1115. For example, a first player attribute can correspond to the first feature 1135*a* and the first player attribute may include a location or team (e.g., Boston professional teams) that a particular player on a player lineup in the first user profile 1110*a* plays for. In an embodiment, six player lineups included in the first user profile may include players from the same Boston team, thus, the first feature 1135*a* can be assigned a value of six. Each of the other features 1135*b*-1135*n* can correspond to different player attributes, contest attributes or a combination of both associated the user profile corresponding to the first user vector 1115.

The multidimensional user vector can be computed based on the values of each feature 1135*a*-1135*n*. The content management system 1000 can assign different weights to each feature such that certain features may more importance than others when determining an impact of the multidimensional user vector.

The first user vector 1115 can be generated by the content management system 1000 using a clustering algorithm. The content management system 1000 can implement the clustering algorithm to identify user profiles that are similar, such as but not limited to, by comparing the player lineups of user profiles, contests that the users are participating in, geographical information associated with the user profile, online activity monitored via the application of the content management system, among others. In some embodiments, the content management system 1000 can use the clustering algorithm to generate a plurality of user clusters. Each user cluster can include a plurality of user vectors corresponding to particular user profiles. It should be appreciated that one or more known clustering techniques can be used to generate user clusters based on a distance between respective multidimensional user vectors of user profiles. The clustering algorithm can generate statistics on each of the user profiles and their respective attributes to group user profiles to one or more user clusters. The statistics can include the historical data included in the activity profiles of the user profiles, the player attributes included in the player lineups in the user profiles and the contest attributes for contests associated with the user profiles.

Figure 12:
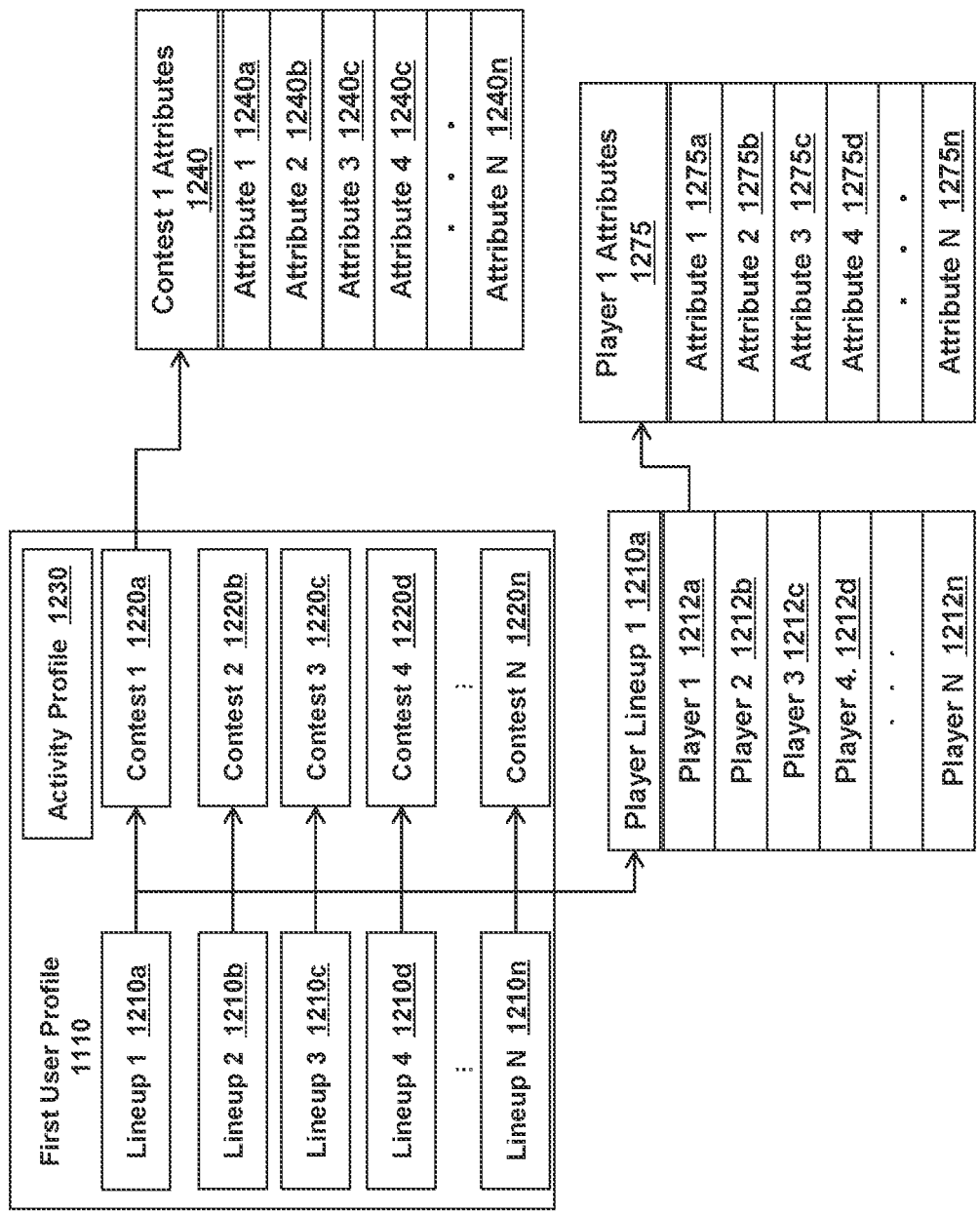
FIG. 12 depicts one or more embodiments of the first user profile of FIG. 11 including player attributes and contest attributes associated with the first user profile.

Now referring to FIG. 12, the first user profile 1110 is illustrated having one or more lineups (e.g., player lineups) 1210*a*-1210*n*, one or more contests 1220*a*-1220*n* and an activity profile 1230.

The lineups 1210*a*-1210*n* may include player lineups, such as but not limited to, fantasy sports lineups. Each of the lineups 1210*a*-1210*n* can be created for a particular contest and can include one or more players selected by the user for the particular contest. The lineups 1210*a*-1210*n* can include previous lineups (or inactive lineups) for past contests that have closed or have otherwise been completed, active lineups for active contests or lineups for future contests. In some embodiments, the lineups 1210a-1210n may include betting lineups, such as but not limited to, for online gambling sites. The lineups 1210a-1210n may be the same as or substantially similar to lineup 912c described above with respect to FIG. 9. The contests 1220a-1220n can include any contest described herein, such as but not limited to, one or more fantasy sports contests.

Each of the lineups 1210a-1210n can be associated with one or more contests 1220a-1220n. For example, each of the lineups 1210a-1210n can be generated by a user for a particular contests 1220a-1220n. In some embodiments, the lineups 1210a-1210n can be used in multiple contests 1220a-1220n. The lineups 1210a-1210n may include a list of players the user selected by the user for the particular contest 1220a-1220n. The number of players included in a respective one of the lineups 1210a-1220n can vary and can be based at least in part on the parameters of the particular contest 1220a-1220n. FIG. 11 shows a detailed player lineup for the first lineup 1210a, however of the remaining lineups 1210b-1210n may include similar player lineups having one or more players.

The players 1212a-1212n can include one or more player attributes 1275a-1275n. As stated above, the player attributes 1275a-1275n can include characteristics of the particular player, such as but not limited to a name, a sport category, a location, a team value, a position value, a price parameter or one or more future contests specific to the respective player. In addition, the player attributes can include statistical information about performances of the player. The player attributes can include additional information relating to injuries of the player, projected performance of the player against a given opponent, as well as any other information that may be determined by the system. The player attributes can also include correlations to statistics associated with the player's team as well as other teammates of the player or players on an opposing team of the player.

Each of the contests 1220a-1220n can include one or more contest attributes 1240a-1240n corresponding to parameters, entry data, requirements, or any combination of them. For example, the contest attributes can include one or more of the following: a sport category, a price parameter, a prize parameter, a registrant threshold, a registrant limit, a current registrant count, a day value, a time value, a duration value, a contest type, and an experience level. The number of attributes 1240a-1240n for a contest 1220a-1220n can vary and be based at least in part on the parameters, entry data, or requirements of the particular contest.

The activity profile 1230 can include a listing of previous contests the user has participated in. For example, the activity profile 1230 can include data corresponding to user interactions with one or more fantasy sports contests executing on a device associated with the respective user. The activity profile can be used to determine a type of user based on the activity profile of the user. For instance, depending on the number of contests the user enters or the frequency at which the user is participating in contests or accessing the application, the system can determine whether the respective user profile is a casual fantasy sports player or a serious fantasy sports player. In some embodiments, the system can store predetermined threshold values with which to compare a user's activity profile to determine the type of user a particular user is.

Now referring to FIG. 13, a personalized lobby 1305 (hereinafter lobby) is provided including contests 1220a-1220n. The personalized lobby 1305 may be the same as or substantially similar to lobby 202 of FIGS. 2A-2B. The lobby 1305 can be a personal lobby and generated for a specific user or based in attributes of a particular one of the user profiles 1110a-1110n. For example, the lobby 1305 can be generated and maintained by the content management system 1000 for a user profile, such as first user profile 1110a. The lobby 1305 includes each of the contest 1220a-1220n and a plurality of contest attributes 1240a-1240f.

In the illustrative embodiment of FIG. 13, the contest attributes 1240a-1240n include sport 1240a, contest type 1240b, entry fee 1240c, total prize money value 1240d, total number of registrants 1240e, registration deadline 1240f, a contest pacing score 1240g, and a contest rank value 1240h. The number of attributes displayed in the lobby 1305 can vary. For example, one or more of any of the contest attributes described herein can be included within the lobby 1305 for each of the contests 1220a-1220n. In some embodiments, the type of contest attributes 1240a-1240n and/or the number of contests attributes 1240a-1240n can be selected based at least in part on the attributes of the user profile the personalized lobby 1305 is generated for.

The sport 1240a can refer to a sport category of the particular contest, such as but not limited to football, basketball, or baseball. The contest style 1240b can refer to a type of contest, such as but not limited to classic style or pick'em style. Entry fee 1240c can refer to a price parameter established that a user must pay to enter and/or register for the particular contest. Total prizes 1240d can refer to the total amount of prize money available for a contest. The total prize money may include a prize for winning the respective contest or an amount of winnings to be divided based upon predetermined payout amounts for placing within a predetermined number of eligible spots in the respective contest.

The registrants 1240e can include the total number of users registered for the particular one of contests 1220a-1220n and a maximum registrant cap. In some embodiments, the registrants 1240e can correspond to a registration ratio between the number of registrants currently registered for a particular contest versus the total number of registrants allowed to register for the particular contest (e.g., capacity limit). The registration deadline 1240f can refer to a deadline when the registration closes or a date as to when the contest management system needs to decide whether to cancel the contest or more forward with the contest. The registration deadline 1240f can include a predetermined time period which indicates a time window (e.g., 22 minutes, 1 hour, 2 hours from deadline) when a decision should be regarding whether to cancel a contest or more forward with a contest. For example, if the registration ratio for a contest hasn't reached a registration threshold (e.g., registration ratio is less than the registration threshold), the contest management may cancel the respective contest. The registration threshold may refer to a threshold that indicates if a contest in on pace or if a contest will be profitable based on the number of users entered or a minimum number of registrants needed to hold a contest.

The contest pacing score 1240g can indicate if a particular contest has met its respective registration threshold, is on target to meet its respective registration target or is at risk of not meeting its respective registration target. For example, in some embodiments, a higher contest pacing score 1240g may indicate that a particular contest has met its respective registration threshold, a lower contest pacing score 1240g may indicate that a particular contest is at risk of not meeting its respective registration threshold, and a middle contest pacing score 1240g or a contest pacing score 1240g between a lower value and a higher value may indicate that a particular contest has not met its respective registration threshold but is on target to meet the registration threshold by the registration deadline.

As described above with respect to FIG. 3, the contest pacing scores 1240g can be computed by the pace tracker 312. The pace tracker 312 can determine a projected or desired number of registrants for a target contest at a particular time (e.g. a particular time relative to opening of registration or close of registration). The projected or desired number of registrants can be determined based on registrant data or a registrant profile for one or more contests similar to the target contest. The projected or desired number of registrants can be determined based on registrant-profile parameters determined for the target contest by the registrant projector 310.

The pace tracker 312 can determine a difference between a number of registrants for the target contest at a point in time (e.g. a current number of registrants) and the projected or desired number of registrants for the point in time. In this manner, the pace tracker 312 can determine if the target contest is below pace or above pace, and to what degree the target contest is below pace or above pace. The contest generator 304 can use this determination to determine a timing for generating a new contest. For example, if the target contest is below pace, the contest generator 304 may delay or restrict generating a new contest as described above. One or more embodiments of methods of using the pace tracker 312 are described herein with reference to FIG. 7A and FIG. 7B.

The pace tracker 312 can further rank contests based on respective pace statuses. For example, the pace tracker 312 can determine, for each contest of a plurality of contests, to what degree the contest is under-saturated or below pace (e.g. by how many participants the contest is below pace, or by a percentage difference between an "on pace" number of participants (e.g. the projected or desired number of participants) and the projected pace, either at the current time or at a future time (e.g. at close of registration)). The pace tracker 312 can determine a rank for each of the plurality of contests (or for a sub-set of the plurality of contests having being under-saturated or below pace to a degree that is equal to or greater than a threshold) based on the pace statuses. The pace tracker 312 can determine a high rank for a contests that is most under-saturated or below pace.

The rank value 1240h can be assigned to contests 1220a-1220n based on the pace status of a respective contest, the contest criteria, and/or profile attributes or a combination of the contest pacing scores 1240g, contest criteria, and/or profile attributes. For example, using a ranking algorithm, the content management system 1000 can determine a rank value 1240h for each of the plurality of contests 1220a-1220n (or for a sub-set of the plurality of contests having being under-saturated or below pace to a degree that is equal to or greater than a threshold) based in part on the contest pacing scores 1240g. In one embodiment, the content management system 1000 can determine a high rank value 1240h for one or more contests that are at risk of not reaching their respective registration threshold (e.g., most under-saturated or below pace) and a low rank value 1240h for one or more contests that have hit their respective registration threshold or are within a predetermined percentage of their respective registration threshold.

The content management system 1000 can use the contest pacing scores 1240g and rank values 1240h to display more prominently one or more of contests 1020a-1020n that are below pace in the lobby 1305. For example, the content management system 1000 can display the contests in the lobby 1305 that are below pace in a predetermined location (e.g. in a prominent position in the lobby, such as at the top or start of a list of contests), or can display the contest according to one or more features, such as a stylistic feature (e.g. a particular text style (which can specify a size, a font, underlining, bold, italics, or another style, and in some embodiments the style is different than the another style used in the lobby), a visual indicator associated with the reference to the similar contest (e.g. a box, circle, or other visual indicator that surrounds or is otherwise positioned relative to the reference), or any other appropriate feature.

In the illustrative embodiment of FIG. 13, the contests 1220a-1220n are arranged in the lobby 1305 according to their respective rank values. For example, contest 1 1220a has a highest rank value, here 1, based in part on its contest pacing score and registration ratio being the lowest or below pace. In contrast, contest N 1220n is listed last and has the lowest rank value, here 5, based in part on its contest pacing score and registration ratio being the highest with respect to the contests listed in the lobby 1305.

The content management system 1000 can use the rank values, contest pacing scores and profile attributes of a corresponding user profile to determine how to arrange the plurality of contests 1220a-1220n in the lobby 1850 that is provided to a user associated with the first user profile 1110a. For example, the contests 1220a-1220n can be arranged by rank values in descending order from the highest rank value to the lowest rank value. In other embodiments, the contests can be arranged by rank values in ascending order from the lowest rank value to the highest rank value.

Data or computer resources to allow a client device to render or otherwise present the lobby 1305 may be transmitted to at least one of the client devices 102a-102n by the content management system 1000. The lobby 1305 shows five contests 1220a-1220n that are open for registration on a first page or first screen, but more contests (including one or more that are open for registration) can be maintained by the content management system 1000 and may be displayable responsive to the client device transmitting a request for more contests to the content management system 1000.

Other information (e.g. contest relevant information) may be displayed in place of, or in addition to, any of the information shown in FIG. 13, and any of the information shown in FIG. 13 may be omitted as appropriate.

Figure 14:
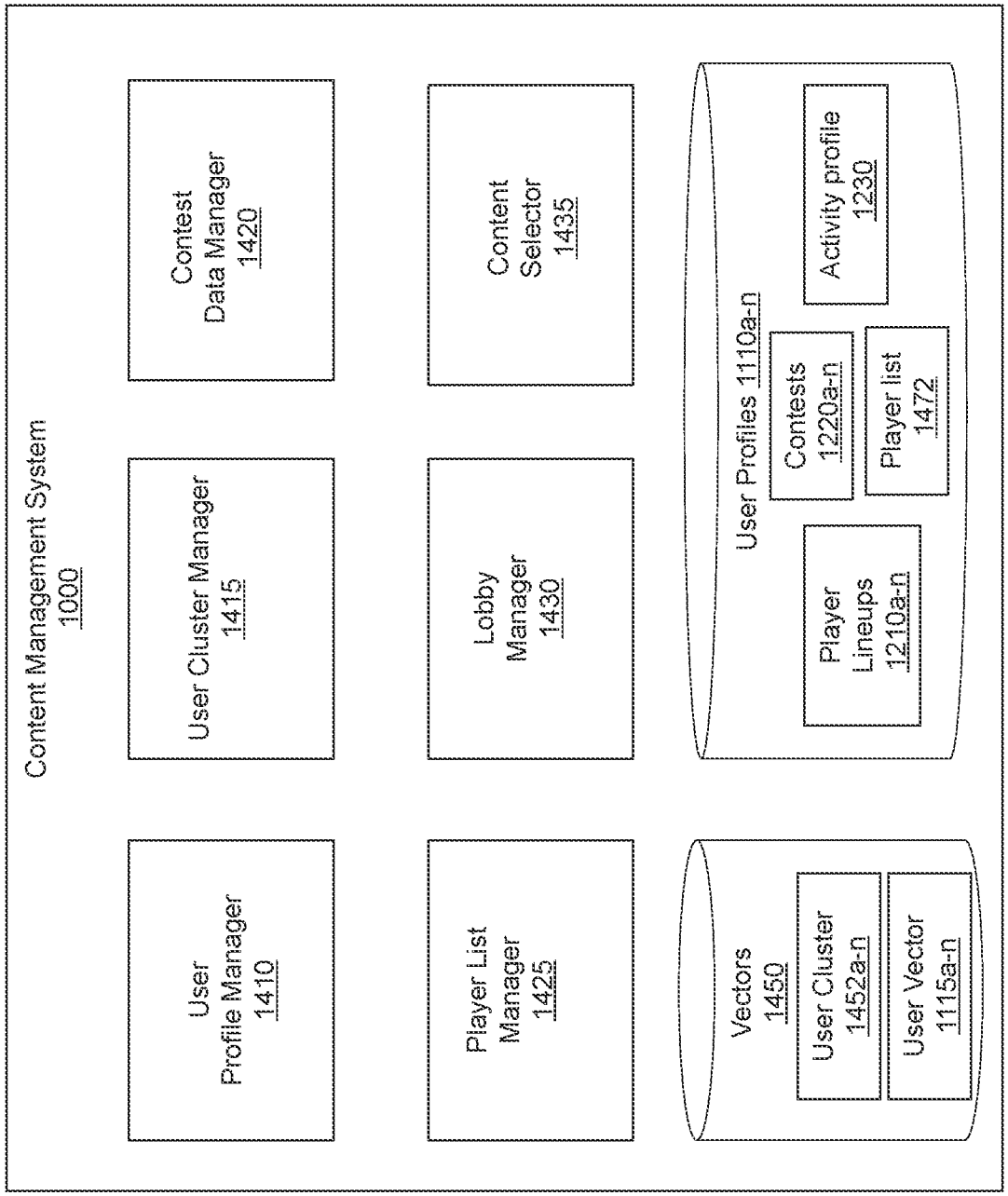
FIG. 14 depicts one or more embodiments of a block diagram of a contest management system.

Now referring to FIG. 14, a block diagram depicting an embodiment of the content management system 1000 is shown. The content management system 1000 can include or be executed on one or more servers, such as the servers 106 shown in FIG. 1A. The content management system 1000 can be the same as or substantially similar to the content management system 206 of FIG. 1C. The content management system 1000 can include one or more user profile manager 1410, user cluster manager 1415, contest data manager 1420, a player list manager 1425, a lobby manager 1430, and a contest selector 1435. The content management system 1000 can also include, access, maintain or manage one or more data structures, including but not limited to a vectors data structure 1450 (or vector management system), and a user profiles data structure 1960. The vectors data structure 1450 can store one or more user clusters 1752 and one or more user vectors 1115. The user profiles data structure 1960 can store one or more user profiles 1110a-n corresponding to users of the fantasy sports platform. The user profiles 1110a-n can include player lineups 1210a-n generated for one or more contests 1220a-n in which the user submitted a player lineup 1210 and an activity profile 1230 of the user including information relating to usage of the application executing on a client device as well as other information obtained by the fantasy sports platform via interactions with the user through application, browser, or other data sources to which the fantasy sports platform has access.

The user profile manager 1410 can comprise components, subsystems, modules, scripts or one or more sets of computer-executable instructions and can be configured to identify and store user profiles 1110a-n created, registered and/or used to enter one or more contests. The user profile manager 1410 can manage completed user profiles and incomplete user profiles (e.g., user profiles missing data). The user profile manager 1410 can generate user profiles, such as the first user profile 1110a. The user profile manager 1410 can access, from a plurality of databases and other data sources, one or more attributes associated with one or more players included in player lineups 1210a generated by the user and included in the first user profile 1110a. In addition, the user profile manager 1410 can access, from a plurality of databases and other data sources, one or more attributes associated with one or more contests 1220a-n for which the user submitted one or more player lineups 1210a. The user profile manager 1410 can also use activity information from an activity profile 1230 that can include any information accessible to the user profile manager 1410 that the user has provided or otherwise helped the content management system 1000 generate or otherwise acquire.

The user profile manager 1410 can be configured to generate a user vector 1115 for each user profile 1110 based on the lineups 1210, contests 1220 and activity profile 1230 associated with the user profile 1110. The user vector 1115 can include multiple features 1135a-n. Each feature 1135 can include a feature value providing an indication of a strength of a particular feature based on the user's profile 1110. The user profile manager 1410 can generate one or more features 1135 for a user vector based on player attributes 1275 of the players 1212a-n included in each player lineup 1210.

The contest data manager 1420 can comprise components, subsystems, modules, scripts or one or more sets of computer-executable instructions and can be configured to store data corresponding to one or more contests, including but not limited to, contest attributes. The contest data manager 1420 can include a sport category, a price parameter, a prize parameter, a registrant threshold, a registrant limit, a current registrant count, a day value, a time value, a duration value, a contest type, and an experience level required for a particular contest. The contest data manager 1420 may include data corresponding to previous contests, active contests or future contests.

The player list manager 1425 can comprise components, subsystems, modules, scripts or one or more sets of computer-executable instructions and can be configured to manage player lists for users of the content management system 1000. The player list manager 1425 can be configured to access accounts of users and/or the user profiles 1110a-n of the content management system 1000. In some embodiments, the accounts of users can be linked to the user profiles 1110a-n.

The player list manager 1425 is configured to maintain, for each user, one or more player lineups 1210a-n. The player lineups 1210a-n can include a list of all of the players that the user has selected in one or more lineups for one or more contests. The player list manager 1425 can be configured to receive updates and modifications to the player lineups 1210a-n including statistics about each player included in the player lineups. In addition, the player list manager 1425 can include information about a value assigned to each player as well as a number of fantasy points assigned to each player based on the player's in-game performance.

In some embodiments, the player list manager 1425 can be configured to establish a web socket connection with one or more servers of one or more fantasy sports systems and be configured to receive activity updates of the users. In some embodiments, the content management system 1000 may identify a user's account at the fantasy sports system and link the respective accounts of the user. As described herein, the content management system 1000 can include or be part of a content management system or the fantasy sports platform, and as such, may be configured to receive and access data generated by or otherwise accessible to the content management system or the fantasy sports platform. In this way, lineup changes, additions, or deletions made in an account of a user of the fantasy sports system can be provided to the content management system 1000, thereby allowing the content management system 1000, or the player list manager 1425, to update the player lineups 1210a-n of user profiles 1110a-n.

The player list manager 1425 can be configured to receive, for a user of the content management system 1000, from a fantasy sports system, a communication identifying a fantasy lineup and an account of the user maintained by the fantasy sports system. The player list manager 1425 can use the account of the user maintained by the fantasy sports system to identify the corresponding account of the user maintained by the content management system 1000 to which the account of the user of the fantasy sports system is linked. The player list manager 1425 can then retrieve player lineups 1210a-n associated with the account of the user maintained by the content management system 1000 and identify each of the players included in the respective player lineups 1210a-n and maintain a count of the number of times a particular player has been selected or included in the player lineups 1210a-n. In some embodiments, the player list manager 1425 can maintain a player list 1472 that includes each of the players included in the player lineups 1210a-n.

In some embodiments, the player list manager 1425 can maintain, for each player in the player list 1472, a number of lineups of the user in which the player is included. The player list manager 1425 can also maintain, for each player in the player list 1472, an expiration condition according to which the player will be removed from the player list 1472. For instance, the player is removed from the player list when the player is no longer included in any fantasy lineup of the user for contests that are ongoing or are scheduled for the future. As such, the player list manager 1425 can remove the player from the player list 1472 once the expiration condition is satisfied. In some embodiments, the expiration condition is satisfied when all of the sporting events of a particular fantasy contest have ended. In some embodiments, the expiration condition is satisfied when all of the sporting events of a particular fantasy contest have begun. In some embodiments, the player list manager 1425 can receive score updates from one or more content servers and use the score updates to determine when sporting events end. In this way, the player list manager 1425 maintains a list of players that are relevant to a user in that the players are part of lineups submitted for contests having one or more sporting events that have yet to be completed. In some embodiments, players may be removed from a player list after a certain amount of time (for example, 1 week, 1 month, 1 year, etc.) has passed since the player was included in a player lineup that was entered into a contest.

Although the player list manager 1425 as described herein may receive a list of players associated with a user from the fantasy sports system, the player list manager 1425 can be configured to receive the list of players from the client device of the user. In some embodiments the player list manager 1425 can be configured to determine the list of players from the request for content received from the user. In some embodiments, the request for content can include the list of players that the user is interested in, which can be based on players that are included in one or more fantasy lineups. In some embodiments, the request for content generated by the client device or the application executing on the client device can include the list of players responsive to determining that a configuration setting for filtering content based on the players included in one or more fantasy lineups of the user. In some embodiments, the request for content can include a flag or other indicator indicating that the status of the configuration setting for filtering the content. For instance, the flag can be set to a first value if the configuration setting is enabled and the flag can be set to a second value if the configuration setting is disabled.

Referring again to the user profile manager 1410, the user profile manager 1410 can be configured to generate the user vector of a user profile based on input from the contest data manager 1420 and the player list manager 1425. The user profile manager 1410 can generate the multidimensional vector based on the players selected by the user in one or more lineups as well as the contests for which the user has registered. The multidimensional vector can apply weights to different features or values of features based on additional information relating to the user, for instance, a user's geographical location, a user's declared interests, one or more inferred interests or preferences of the user, among others. Furthermore, the user profile manager 1410 can import information from other users to further enhance a user's multidimensional vector 1115. For instance, the user profile manager 1410 can identify one or more users that are similar to the user based on their respective multidimensional user vectors and can determine information common across some or many users in the cluster of users that the user profile manager 1410 may import into the user. For instance, if users in the cluster of users prefer a certain player or players having a certain attribute, the user profile manager 1410 may adjust the multidimensional vector of the user to indicate that the user also prefers the certain player or players having the certain attribute.

The lobby manager 1430 can comprise components, subsystems, modules, scripts or one or more sets of computer-executable instructions and can be configured to manage one or more lobbies that can be provided to one or more users. The lobby manage 1430 can include, generate, and manage lobby 1305 of FIG. 13 and lobby 202 of FIGS. 2A-2B. For example, a lobby (e.g., lobby 1305 of FIG. 13, lobby 202 of FIGS. 2A-2B) is a data structure that can include one or more contests arranged according to a particular order and can be provided to a device to enable a user to select a contest from the lobby. The lobby may display contests that are determined to be below pace more prominently than other contests that are at or above pace. The pace can be determined using pacing parameters or contest pacing scores generated by the content management system 1000 or the lobby manager 1430.

For example, the user can select a contest to enter the contest or to learn more about the contests. The lobby manager 1430 can be configured to generate a lobby including one or more contests responsive to the user action. The lobby can include one or more active contests that are currently in progress, one or more future contests for which registration is still open, and one or more past contests for which the contests have already ended. The contests can be displayed based in part on their respective pacing parameters. Thus, contests that are below pace can be displayed first or otherwise before contests that are on pace or ahead of pace.

The lobby manager 1430 can be configured to generate a lobby that can be transmitted to a plurality of users or can generate a personalized lobby based on the user vector of a given user. Additional details regarding the lobby manager 1430 are described below.

The content selector 1435 can comprise components, subsystems, modules, scripts or one or more sets of computer-executable instructions and can be configured to select content to transmit to devices of users associated with user profiles maintained by the content management system 1000. The content selector 1435 can be configured to transmit content items responsive to the content management system 1000 or the content management system 206 receiving requests from applications executing on such devices of users.

The content selector 1435 can be configured to determine the type of content items to transmit to the application executing on a device of a user responsive to the request received from the application as well as based on state information associated with the application at the time the request was transmitted. The state information associated with the application at the time the request was transmitted can be determined by establishing a persistent connection, such as a web socket connection with the application to determine which page of the application the user is on, one or more configuration settings set on the application, among others. The content selector 1435 can determine, from the request or the state information, the type of content to transmit to the client device on which the application is executing.

The content selector 1435 can identify, from a plurality of content items accessible to the content management system 1000, a subset of content items to transmit to the application. In some embodiments, the content selector 1435 can maintain a queue of content items to transmit to the application. The content items can be selected using the user vector associated with the user. In some embodiments, the queue of content items can be ordered in accordance to chronological order or reverse chronological order. For instance, the content items can be ordered based on a timestamp of the content item such that the content item that the content management system most recently received is placed at the top of the queue of content items. The content selector 1435 can be configured to rearrange the content items included in the queue of content items as the user adjusts one or more content filtering parameters on the application. The content selector 1435 can prioritize one or more content items over other content items included in the queue of content items. The content filtering parameters can include parameters that affect which content is selected by the content selector 1435 for transmission and/or display to the client device. The content filtering parameters may change as the user navigates to different pages on the application or as the user changes the type of content items the user would like to view in the content feed.

The content selector 1435 can be configured to assign a priority score to each content item included in the queue. The priority score can be determined based on the tags associated with the content item. The priority score can be determined based on the tags associated with the content item and based on the players included in the player list of the user maintained by the player list manager 1425. As players are removed from the player list manager, the priority score of content items having player tags associated with such players can be decreased. Conversely, as players are added to the player list manager, the priority score of content items having player tags associated with players that have been added can be increased. In some embodiments, the content selector 1435, or the content management system 1000, may transmit content items based on the priority scores of the content items. Stated in another way, the content selector 1435, or the content management system 1000, may transmit content items that relate to players included in the player list before transmitting content items that relate to players not included in the list.

In some embodiments, the content selector 1435 can be configured to send all of the content identified or accepted by the content management system 1000. The content selector 1435 may send the content with one or more tags assigned by the content labeler. The content selector 1435 can be configured to communicate with the application executing on the client device to transmit all of the content items to the client device.

The vector data structure 1450 is a data structure that can store one or more user clusters 1452*a*-*n* and one or more user vectors 1115*a*-*n*. The vector data structure can be maintained by the content management system 1000. In some embodiments, the vector data structure 1450 can be stored on a server of the content management system 1000 or can be accessed by the contest management system.

In some embodiments, the content management system 1000 can be configured to modify the user clusters 1452*a*-*n* or user vectors 1115*a*-*n*. In some embodiments, as new user vectors 1115 are generated, the user vectors can be assigned to one or more user clusters 1452 based on a similarity between the user vector 1115 and the user clusters 1452. In addition, the content management system 1000 can assign one or more tags to each user vector 1115 and/or user cluster 1452 based on attributes of the user vector or user cluster. These tags can be based on a weight of a particular attribute. For instance, if a user vector includes a lot of players that play football but no players that play basketball, the content management system 1000 can assign a football tag to the user vector. These tags can be used by various modules of the content management system 1000 for selecting content, for arranging lobbies, or for identifying similar users.

The content management system 1000 can include or execute a ranking algorithm, to filter, rank, and organize contests and contests data for presentation to a user, such as for display in a lobby (e.g., lobby 1305 of FIG. 13, lobby 202 of FIGS. 2A-2B). The content management system 1000, using a ranking algorithm, can be configured to assign frequency values, importance values, rank values, and/or weights to contests, contest attributes, and player attributes. The content management system 1000 can use the ranking algorithm to determine what contests are below pace and thus, rank them ahead of contests that are on pace or ahead of pace.

Figure 15A:
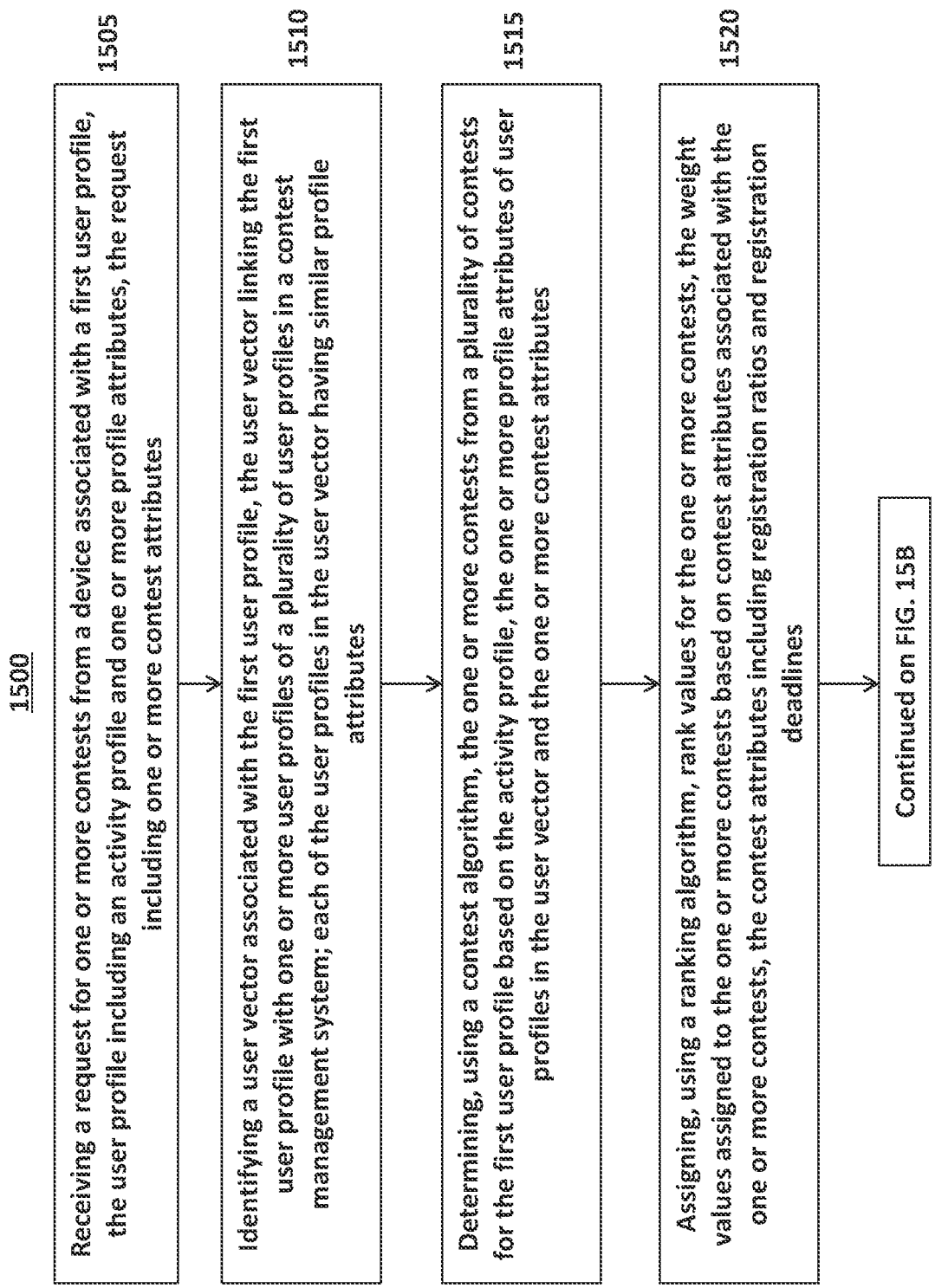

Now referring to FIGS. 15A-15B, a method 1500 for generating a personalized lobby 1305 including contests 1220 based on contest attributes and user attributes for one or more users of a contest management system 1000 begins at block 1505, by receiving a request for one or more contests 1220 from a device associated with a first user profile 1110. The content management system 1000 can include a system for generating, hosting and maintaining fantasy sports contests (e.g., content management system 1000 of FIG. 10, contest management system 206 of FIG. 1C). Contests 1220 as used and described herein can include fantasy sports contests (e.g., fantasy football, fantasy baseball, etc.).

The content management system 1000 can receive a request from a device associate with one or more user profiles 1110. The device can include any client device and/or computing device the user uses to receive data related to a contest and/or participate in a contest, such as but not limited to, client devices 102*a*-102*n* of FIG. 1A-1B or computing devices 100 of FIGS. 1C-1D. Each user profile 1110 may include identifiers for one or more devices associated with the respective user the user profile 1110 is associated with. For example, when a user registers with the content management system 1000 and/or participates in a contest 1220, a user profile 1110 can be generated for the user and the device or devices the user uses to access the content management system 1000 can be stored and/or an identifier correspond to the device or devices can be stored in the respective user profile. The content management system 1000 can maintain a plurality of user profiles 1110 and generate and provide content to devices associated with the plurality of user profiles 1110, as will be described in greater detail below.

The request can include one or more contest attributes 1240 corresponding to one or more contests 1220 the user profile 1110 is interested in. The contest attributes 1240 can include one or more of the following: a sport category, a price parameter, a prize parameter, a registrant threshold, a registrant limit, a current registrant count, a registration ratio, a registration deadline, a pacing value, a rank value, a day value, a time value, a duration value, a contest type, and an experience level.

The user profiles 1110 can include an activity profile 1230 and/or one or more profile attributes 1275. The profile attributes can include one or more of the following: a history of past contests, a plurality of lineups, a user type, a location, the activity profile 1230 and price parameters. In some embodiments, the user profiles 1110 can include one or more lineups 1210 (e.g., player lineups) and the lineups 1210 can include player attributes 1275, such as but not limited to one or more of the following: a name, a sport category, a location, a team value, a position value, a price parameter or one or more future contests specific to the respective player. In some embodiments, the activity profile 1230 may indicate an experience level of the user profile 1110.

At block 1510, a user vector 1115 associated with the first user profile 1110 can be identified. The user vector 1115 can link the first user profile 1110 with one or more user profiles 1110 of a plurality of user profiles 1110 in the content management system 1000. Each of the user profiles 1110 in the user vector 1115 can have one or more similar or common profile attributes.

The content management system 1000 can generate one or more multidimensional user vectors 1115 (hereinafter user vector) for one or more user profiles 1110. The user vector 615 can include a plurality of features 1135 with each of the features 1135 having a respective value that can be based on the profile attributes identified in one or more of the user profiles 1110 linked by a respective user vector 1115, one or more player attributes 1275 corresponding to the players 1212 included in the one or more player lineups 1210 identified in one or more of the user profiles 1110 linked by a respective user vector 1115 and/or the contest attributes 1240 corresponding to the contests 1220 for which the one or more of the user profiles 1110 linked by a respective user vector 1115 participated in.

The features 1135 can correspond to the particular attributes used to identify similarities between the different user profiles 1110. The value can correspond to a frequency value and indicate a frequency that the feature 1135 (e.g., respective profile attribute or contest attribute) appears in each of the user profiles 1110 linked by the user vector 1115. For example, if a profile attributes appears in five different user profiles 1110 of the user vector 1115, that particular profile attribute can be assigned a frequency value of five. If seven different user profiles 1110 have participated in the same contest 1220, that particular contest 1220 can be assigned a frequency value of seven. The frequency value can be a fraction or percentage based on the frequency that the feature 1135 appears in each of the user profiles 1110 linked by the user vector 1115.

The attributes can be listed or otherwise arranged within the user vector 1115 based on their respective frequency value. For example, the attributes can be listed in descending order with attributes having the highest frequency value listed first or the attributes can be listed in ascending order with attributes having the lowest frequency value listed first. The attributes can be listed in any logical order within the user vector 1115. In some embodiments, the attributes can be assigned an importance value such that some attributes are ranked higher or lower than other attributes used to generate the user vector. The attributes can be arranged using a combination of their respective frequency value and importance value.

At block 1515, one or more contests 1220 from a plurality of contests 1220 can be determined for the first user profile 1110 based on the activity profile 1230, the one or more profile attributes of the user profiles 1110 in the user vector 1115, the one or more contest attributes 1240, and/or contest pacing scores corresponding to the contests 1220. The content management system 1000 can use a selection algorithm to identify contests 1220 that the first user profile 1110 may be interested in and more likely to participate in based in part to the profile attributes of the first user profile 1110, profiles attributes of other user profiles 1110 in the user vector 1115 and/or contest attributes 1240 from contest 1220 the first user profile 1110 has participated in and/or contests 1220 other user profiles 1110 in the user vector 1115 have participated in. The selection algorithm can extract the profile attributes and/or contest attributes 1240 to generate recommendations for the first user profile 1110.

In some embodiments, the selection algorithm can identify common profile attributes between the first user profile 1110 and the other user profiles 1110 in the user vector 1115 and identify previous, active or future contests 1220 that the other user profiles 1110 in the user vector 1115 have participated in or entered and select those contests 1220 as possible recommendations for the first user profile 1110. The selection algorithm can use any combination of profile attributes, contest attributes 1240, and contest pacing scores to identify contests 1220 for the first user profile 1110. For example, in some embodiments, the selection algorithm may identify contests 1220 for the first user profile 1110 based in part on pacing parameters of one or more contests 1220 and if other user profiles 1110 in the user vector 1115 have registered for the one or more contests 1220. Thus, the selection algorithm can determine one or more contests 1220 that the first user profile 1110 is likely to be interested in and participate in, based at least in part on the similarities between the first user profile 1110 and other user profiles 1110 in the user vector 1115.

In some embodiments, the content management system 1000 can generate a contest profile for the first user profile 1110 based on the activity profile 1230 of the first user profile 1110. The activity profile 1230 can include a contest history, user history and a user type for the first user profile 1110. For example, the activity profile 1230 can include data corresponding to user interactions with one or more fantasy sports contests 1220 executing on a device associated with the respective user. The user history can include one or more historical contests 1220 that are associated with a user (e.g. in which a user has participated). The historical contests 1220 can be contests in which the user has registered and which have not yet ended or can be contests 1220 that have ended. The contest 1220 may be associated with information including values for parameters (e.g. any parameters described herein, including contest-generating parameters and context parameters). The content management system 1000 can update or modify the activity profiles 1230 of the user profiles 1110 linked by the user vector 1115 when a respective user registers and/or participates in a new contest 1220. The contest profile can include a plurality of contest attributes 1240 for contests 1220 that the first user has participated in previously. The content management system 1000 can use the contest profile to generate new contests 1220 having similar or common contests attributes 1240 such that the first user profile 1110 is more likely to participate in the new contest 1220.

At block 1520, rank values 1240$h$ can be assigned to the one or more contests 1220 determined by the content management system 1000 for the first user profile 1110. The content management system 1000 can use a ranking algorithm to assign rank values 1240$h$ to the one or more contests 1220 based on contests attributes 1240 of the one or more contests 1220, such as but not limited to, registration ratios 1240$e$, registration deadlines 1240$f$, and contest pacing scores 1240$g$.

The content management system 1000 can execute the selection algorithm to analyze the contest attributes 1240 of each of the one or more contests 1220 and generate a rank value 1240$h$ based in part on the contest attributes 1240 and/or profile attributes of user profiles 1110 in the user vector 1115. The selection algorithm may include a machine-learning algorithm that can be configured to determining accurate pacing parameters, such as but not limited to registration ratios 1240$e$, registration thresholds, registration deadlines 1240$f$, and contest pacing scores 1240$g$, for one or more target contests 1220 and generate an accurate projection of a number of registrants for the target contest 1220 at a time T. For example, the rank values 1240$h$ can indicate a pacing of the respective contests 1220. The rank values 1240$h$ can be used to identify contests 1220 that are at risk of not reaching their respective registration threshold (e.g., most under-saturated or below pace) and recommend these contests 1220 to the first user profile 1110 and/or other user profiles 1110 in the user vector 1115. For example, in some embodiments, a lower rank value 1240$h$ may indicate that a particular contest 1220 has met its respective registration threshold, a higher rank value 1240$h$ may indicate that a particular contest 1220 is at risk of not meeting its respective registration threshold, and a middle rank value 1240$h$ between a lower value and a higher value may indicate that a particular contest 1220 has not met its respective registration threshold but is on target to meet the registration threshold by the registration deadline 1240$f$. Thus, the selection algorithm can use contest pacing to identify contests 1220 that may be at risk of not meeting their respective registration threshold and also identify one or more users that have participated in similar contests 1220 and provide the contests 1220 to devices associated with the users, for example, as recommendations, to aid the respective contests 1220 in meeting their registration thresholds. In some embodiments, the rank values 1240$h$ can indicate a degree of similarity between contests other user profiles 1110 in the user vector 1115 have participated in.

The content management system 1000 can extract, from the one or more user profiles 1110 linked with the first user profile 1110 in the user vector 1115, a plurality of profile attributes. The profile attributes can include contests 1220 in which the first user profile 1110 has participated and contests 1220 in which the one or more user profiles 1110 linked with the first user profile 1110 in the user vector 1115 have participated. The content management system 1000 can use the extracted attributes to generate one or more recommendations for contests 1220 from the plurality of contests 1220 based on the plurality of profile attributes. The recommendations can be for the first user profile 1110 and/or any other user profile 1110 linked by the user vector 1115.

At block 1525, a first personalized lobby 1305 can be generated for the first user profile 1110 having the one or more contests 1220. The content management system 1000 can generate the first personalized lobby 1305 for the first user having the one or more contests 1220 are arranged according to their respective rank values 1240$h$. The personalized lobby 1305 can include a predetermined layout of content, including but not limited to contests 1220, that are displayed at one or more predetermined locations. The content can be displayed in any logical order. For example, in some embodiments, a plurality of contests 1220 can be displayed based on their respective rank values 1240$h$ in ascending or descending order.

In some embodiments, the personalized lobby 1305 can display the contests 1220 such that contests 1220 that are below pace or below pace to a degree that is equal to or above a threshold, are displayed in a more prominent positioned within the personalized lobby 1305. For example, the contests 1220 that are below pace can be displayed at the top, first, start of a list, or include one or more features, such as a stylistic feature (e.g. a particular text style (which can specify a size, a font, underlining, bold, italics, or another style, and in some embodiments the particular text style is different than another style used in the contest display), a visual indicator associated with such below pace contests (e.g. a box, circle, or other visual indicator that surrounds or is otherwise positioned relative to the below pace contests), or any other appropriate feature. The content management system 1000 can use the rank values 1240$h$ to determine the layout for the personalized lobby 1305 such that one or more contests 1220 that are determined to be below pace may be displayed more prominently than would otherwise be the case.

At block 1530, the first personalized lobby 1305 can be provided to the device associated with the first user profile 1110 with the one or more contests 1220 arranged in the personalized lobby 1305 based on a likelihood that a first user associated with the first user profile 1110 will participate in the one or more contests 1220. In some embodiments, the content management system 1000 can update the recommendations provided in the first personalized lobby 1305 based on modifications to the first user profile 1110 or at least one user profile 1110 of the one or more user profiles 1110 linked with the first user profile 1110 in the user vector 1115. For example, modifications to the first user profile 1110 and/or modifications to other user profiles 1110 in the user vector 1115 can be identified by the content management system 1000 and, responsive to these modifications, the content management system 1000 can generate new recommendations, delete recommendations and/or update previous recommendations provided to the personalized lobbies 1305 of user profiles 1110 in the user vector 1115.

A personalized lobby 1305 can be generated for each of the user profiles 1110 in the user vector 1115. For example, in some embodiments, the content management system 1000 can generate a second personalized lobby 1305 for a second user profile 1110 of the one or more user profiles 1110 linked with the first user profile 1110 in the user vector 1115. The second personalized lobby 1305 can include the one or more contests 1220 arranged in the second personalized lobby 1305 according to their respective rank values 1240$h$. The second personalized lobby 1305 may be the same as the first personalized lobby 1305, different from the first personalized lobby 1305 or include one or more common contests 1220 as the first personalized lobby 1305 and one or more different contests 1220 from the first personalized lobby 1305. The content management system 1000 can provide the second personalized lobby 1305 to a device associated with the second user profile 1110 with the one or more contests 1220 arranged in the personalized based on a likelihood that a second user associated with the second user profile 1110 will participate in the one or more contests 1220.

The content management system 1000 may extract, from the second user profile 1110, a plurality of profile attributes with the plurality of profile attributes including contests 1220 in which the second user profile 1110 has participated and contests 1220 in which the one or more user profiles 1110 linked with the first user profile 1110 in the user vector 1115 have participated. The content management system 1000 can use the extracted attributes to generate one or more recommendations for contests 1220 from the plurality of contests 1220 based on the plurality of profile attributes. In some embodiments, the content management system 1000 can update the recommendations provided in the second personalized lobby 1305 based on modifications to the first user profile 1110 or at least one user profile 1110 of the one or more user profiles 1110 linked with the first user profile 1110 in the user vector 1115.

It should be appreciated that although the specification and claims refer to fantasy sports, the application is not limited to fantasy sports. Rather, the scope of the application may extend to other contexts where a contest management server maintains a dynamic set of resources that can be monitored for projected utilization and actions can be taken based on the projected utilization, including the generation or allocation of new resources or actions that cause traffic to be directed to one or more resources of the existing set of resources.

The invention claimed is:

1. A method, comprising:
  receiving, by one or more processors, a request for contests from a device associated with a first user profile including one or more profile attributes, the device executing an application configured to present a lobby corresponding to the first user profile;
  determining, by the one or more processors, for each contest of one or more contests, based on a current number of registrants entered into the contest and an amount of time until a registration deadline of the contest, a projected number of registrants at the registration deadline of the contest;
  assigning, by the one or more processors, to each contest of the one or more contests, a respective rank value based on the projected number of registrants at the registration deadline of the contest; and providing, by the one or more processors, one or more respective identifiers of the one or more contests to the device for display in the lobby of the application according to the respective rank value for each contest of the one or more contests.

2. The method of claim 1, wherein determining the projected number of registrants for each contest of the one or more contests is further based on registrant data of one or more similar contests.

3. The method of claim 1, further comprising:
restricting, by the one or more processors, generation of an additional contest based on the projected number of registrants of at least one contest of the one or more contests.

4. The method of claim 1, wherein assigning the respective rank value to each contest of the one or more contests comprises:
assigning, by the one or more processors, a first rank to a first contest of the one or more contests and a second rank to a second contest of the one or more contests, the first rank greater than the second rank, wherein the projected number of registrants of the first contest is less than the projected number of registrants of the second contest.

5. The method of claim 1, further comprising generating, by the one or more processors, the lobby for the first user profile including the one or more contests, wherein the one or more contests are arranged in the lobby according to the respective rank value for each contest of the one or more contests.

6. The method of claim 1, further comprising identifying, by the one or more processors, the one or more contests from a plurality of contests based on the one or more profile attributes of the first user profile.

7. The method of claim 1, further comprising providing, by the one or more processors, the one or more respective identifiers of the one or more contests to a second device configured to present a second lobby, the second device associated with a second user profile linked with the first user profile, the second lobby presenting the one or more contests arranged in the second lobby based on a likelihood that a second user associated with the second user profile will participate in the one or more contests.

8. The method of claim 7, further comprising:
identifying, by the one or more processors, one or more historic contests in which the second user profile has participated; and
generating, by the one or more processors, one or more recommendations for contests from a plurality of contests based on the one or more historic contests in which the second user profile has participated.

9. The method of claim 1, wherein the one or more profile attributes include one or more of a history of past contests, a plurality of lineups, a user type, a location, and price parameters.

10. The method of claim 1, wherein one or more contest attributes of each contest of one or more contests include one or more of a sport category, a price parameter, a prize parameter, a registrant threshold, a registrant limit, a current registrant count, a day value, a time value, a duration value, a contest type, and an experience level.

11. A system, comprising:
one or more processors coupled to non-transitory memory, the one or more processors configured to:
receive a request for contests from a device associated with a first user profile including one or more profile attributes, the device executing an application configured to present a lobby corresponding to the first user profile;
determine, for each contest of one or more contests, based on a current number of registrants entered into the contest and an amount of time until a registration deadline of the contest, a projected number of registrants at the registration deadline of the contest;
assign, to each contest of the one or more contests, a respective rank value based on the projected number of registrants at the registration deadline of the contest; and
provide one or more respective identifiers of the one or more contests to the device for display in the lobby of the application according to the respective rank value for each contest of the one or more contests.

12. The system of claim 11, wherein the one or more processors are further configured to determine the projected number of registrants for each contest of the one or more contests further based on registrant data of one or more similar contests.

13. The system of claim 11, wherein the one or more processors are further configured to:
restrict generation of an additional contest based on the projected number of registrants of at least one contest of the one or more contests.

14. The system of claim 11, wherein the one or more processors are further configured to assign the respective rank value to each contest of one or more contests by performing operations comprising:
assign a first rank to a first contest of the one or more contests and a second rank to a second contest of the one or more contests, the first rank greater than the second rank, wherein the projected number of registrants of the first contest is less than the projected number of registrants of the second contest.

15. The system of claim 11, wherein the one or more processors are further configured to generate the lobby for the first user profile including the one or more contests, wherein the one or more contests are arranged in the lobby according to the respective rank value for each contest of the one or more contests.

16. The system of claim 11, wherein the one or more processors are further configured to identify the one or more contests from a plurality of contests based on the one or more profile attributes of the first user profile.

17. The system of claim 11, wherein the one or more processors are further configured to provide the one or more respective identifiers of the one or more contests to a second device configured to present a second lobby, the second device associated with a second user profile linked with the first user profile, the second lobby presenting the one or more contests arranged in the second lobby based on a likelihood that a second user associated with the second user profile will participate in the one or more contests.

18. The system of claim 17, wherein the one or more processors are further configured to:
identify one or more historic contests in which the second user profile has participated; and
generate one or more recommendations for contests from a plurality of contests based on the one or more historic contests in which the second user profile has participated.

19. The system of claim 11, wherein the one or more profile attributes include one or more of a history of past contests, a plurality of lineups, a user type, a location, and price parameters.

20. The system of claim 11, wherein one or more contest attributes of each contest of one or more contests include one or more of a sport category, a price parameter, a prize parameter, a registrant threshold, a registrant limit, a current registrant count, a day value, a time value, a duration value, a contest type, and an experience level.

* * * * *